US012345869B2

(12) United States Patent
Taylor et al.

(10) Patent No.: US 12,345,869 B2
(45) Date of Patent: Jul. 1, 2025

(54) MICROSCOPIC FIBER ANALYSIS SYSTEMS AND METHODS

(71) Applicant: Bellu, LLC, Provo, UT (US)

(72) Inventors: Samuel K Taylor, Provo, UT (US); J. Caleb Lystrup, Provo, UT (US); Jacob Gates, Provo, UT (US); Andrew D. James, Spanish Fork, UT (US); Cammi R. Lystrup, Provo, UT (US); Carver J. Coleman, Provo, UT (US); David B. Jackson, Spanish Fork, UT (US); Marin James, Spanish Fork, UT (US)

(73) Assignee: Bellu, LLC, Provo, UT (US)

( * ) Notice: Subject to any disclaimer, the term of this patent is extended or adjusted under 35 U.S.C. 154(b) by 225 days.

(21) Appl. No.: 18/322,175

(22) Filed: May 23, 2023

(65) Prior Publication Data

US 2024/0012231 A1    Jan. 11, 2024

Related U.S. Application Data

(60) Provisional application No. 63/359,002, filed on Jul. 7, 2022.

(51) Int. Cl.
  *G06K 9/00* (2022.01)
  *A61B 5/00* (2006.01)
  *B01L 3/00* (2006.01)
  *G01N 1/28* (2006.01)
  (Continued)

(52) U.S. Cl.
  CPC ............ *G02B 21/362* (2013.01); *B01L 3/508* (2013.01); *G01N 1/2813* (2013.01); *H04N 23/64* (2023.01); *B01L 2200/025* (2013.01); *B01L 2300/0822* (2013.01)

(58) Field of Classification Search
  CPC . G02B 21/362; B01L 3/508; B01L 2200/025; B01L 2300/0822; G01N 1/2813; H04N 23/64; H04N 23/60
  See application file for complete search history.

(56) References Cited

U.S. PATENT DOCUMENTS 11,172,873 B2 * 11/2021 Purwar ................... G06N 3/045
11,766,837 B2 *  9/2023 Makeev ................... B29C 70/08
                                                       442/179
12,234,428 B2 *  2/2025 Dreher ................. C11D 17/042
(Continued)

FOREIGN PATENT DOCUMENTS

WO    WO 2017/032637 A1    3/2017

*Primary Examiner* — Howard D Brown, Jr.
(74) *Attorney, Agent, or Firm* — Knobbe Martens Olson & Bear LLP

(57) ABSTRACT

A hair follicle analysis system may be used to determine an assessment of a hair follicle sample. The hair follicle analysis system may be configured to obtain imagery of the hair follicle sample and determine, using a trained model and based on the imagery of the hair follicle sample, a follicle condition associated with the hair follicle sample. The hair follicle analysis system may receive at least one of a plurality of hair follicle descriptors associated with the hair follicle sample. The hair follicle analysis system may determine, based on the follicle condition and on the at least one of the plurality of hair follicle descriptors, an assessment of the hair follicle sample. The hair follicle analysis system may transmit a report of the assessment of the hair follicle sample to a remote computing device.

20 Claims, 14 Drawing Sheets

(51) Int. Cl.
  *G02B 21/36* (2006.01)
  *H04N 23/60* (2023.01)

(56) References Cited

U.S. PATENT DOCUMENTS

| | | | |
|---|---|---|---|
| 2015/0118195 A1* | 4/2015 | Mao | D01D 5/06 428/394 |
| 2019/0070339 A1* | 3/2019 | Gerecht | A61L 27/3808 |
| 2021/0322482 A1* | 10/2021 | Sun | C12N 5/0668 |

* cited by examiner

MICROSCOPIC FIBER ANALYSIS SYSTEMS AND METHODS

BACKGROUND

Field

The present disclosure relates to analysis of biological samples, such as hair follicle samples, using fiber scanning systems and computation methods, such as trained machine learning models.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Keratinaceous and other fiber material may include hair follicles, nails, or other organic (e.g., biological) material. The analysis and diagnosis of keratinaceous material have been explored through various approaches. However, the existing diagnostic approaches for the characterization and testing of keratinaceous material exhibit certain limitations and lack comprehensive analysis techniques. For example, modern trichoscopic and trichographic methods have been employed to examine and study keratinaceous material, however, they do not fully meet the demands for improved analysis and diagnosis.

Trichoscopic techniques involve the use of a dermatoscope to magnify and visualize the surface features of the keratinaceous material. Such techniques have proven useful in identifying structural abnormalities, such as hair shaft disorders or scalp diseases. However, trichoscopy is limited in its ability to provide detailed molecular and genetic information of the keratinaceous material. Similarly, trichographic methods utilize specialized imaging systems to capture and analyze structural characteristics of hair or other keratinaceous components. While these methods offer insights into hair growth patterns and density, they do not sufficiently address the need for advanced molecular profiling and precise diagnostic capabilities.

Moreover, the current techniques for keratinaceous material analysis lack the ability to comprehensively assess various properties, such as mechanical strength, thermal resistance, or chemical composition. These limitations hinder the accurate diagnosis and characterization of keratinaceous material, particularly in the context of disorders and diseases affecting hair or nails. Therefore, there is a critical need for improved analysis techniques that can overcome the limitations of existing methods and provide a comprehensive understanding of keratinaceous material, enabling more accurate diagnosis, personalized treatment approaches, and the development of innovative solutions for hair and nail-related conditions.

Described herein are improvements on diagnostic methods for characterizing and/or testing such material.

SUMMARY

In accordance with an embodiment of the present invention, a first aspect discloses a fiber analysis system configured to capture and microscopically analyze an elongate fiber. The fiber analysis system comprises an image sensor configured to obtain microscopic imagery of a portion of the elongate fiber disposed within a sensing region. Further, the fiber analysis system comprises a fiber analysis coupling. The fiber analysis coupling comprises an elongate driving roller extending along and configured to rotate about a drive axis. The elongate driving roller comprises a groove fabricated radially along the elongate driving roller. An actuator is coupled to and configured to drive the elongate driving roller about the drive axis. A mounting is configured to couple the actuator to the image sensor. Further, the fiber analysis coupler comprises an analysis tube coupler configured to equip an analysis tube. Further, an elongate free roller configured to rotate about an axis parallel to the drive axis in response to rotation of the elongate driving roller. The elongate free roller comprises a collar extending radially from the elongate free roller and configured to be received within the groove. The collar and the groove are separated by a space sized to receive the fiber therein.

Further, the analysis tube comprises an aperture and first and second segments separated by a tube bend, and the analysis tube is configured to be positioned within the analysis tube coupler. It may be noted that the rotation of the driving roller is configured to draw the elongate fiber into the aperture of the analysis tube. The tube bend is shaped to cause the fiber to be disposed along an interior surface of the analysis tube within the sensing region. Further, the fiber analysis system comprises a non-transitory memory executable instructions stored thereon. Further, an electronic processor is in communication with the non-transitory memory and configured to execute the instructions to cause the fiber analysis system to at least: cause the actuator to drive the elongate driving roller a first target amount; cause the image sensor to obtain the microscopic imagery of the portion of the elongate fiber disposed within the sensing region; and in response to the obtaining of the microscopic imagery, automatically cause the actuator to drive the elongate driving roller a second target amount.

In accordance with an embodiment of the present invention, a second aspect discloses a fiber analysis coupling configured to capture and microscopically analyze an elongate fiber. The fiber analysis coupling comprises an elongate driving roller extending along and configured to rotate about a drive axis. Further, an actuator is coupled to and configured to drive the elongate driving roller about the drive axis. A mounting is configured to couple the actuator to a microscope configured to obtain microscopic imagery of a portion of the elongate fiber disposed within a sensing region. An elongate free roller is configured to rotate about an axis parallel to the drive axis in response to rotation of the elongate driving roller. The elongate driving roller and the elongate free roller are separated by a space sized to receive the elongate fiber therein.

In accordance with an embodiment of the present invention, a third aspect discloses an analysis tube. The analysis tube comprises an aperture and first and second segments separated by a tube bend elongating a distal interior surface of the analysis tube, the aperture configured to receive a hair follicle into the aperture. The tube bend is shaped to cause the hair follicle to be disposed along a proximal interior surface of the second segment analysis tube opposite the distal interior surface.

DETAILED DESCRIPTION

Overview

Figure 1:
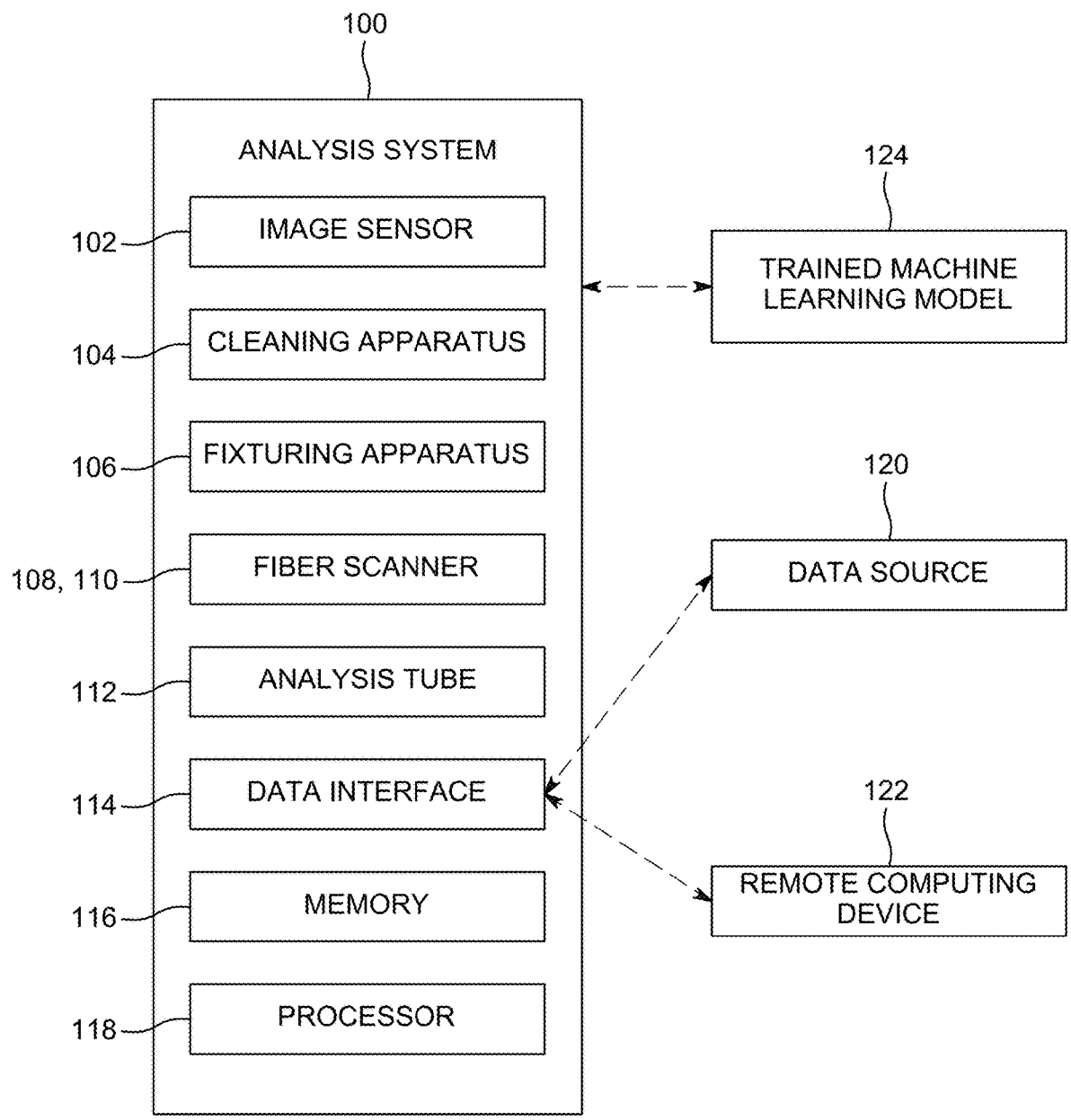
FIG. 1 shows a block diagram of an analysis system, according to some embodiments.

Reference will now be made in detail to example embodiments, the examples of which are illustrated in the accompanying drawings. Whenever possible, the same reference numbers will be used throughout the drawings to refer to the same or like parts.

Disclosed herein are example systems and methods for analyzing image data related to a keratinaceous sample, such as a hair follicle sample. The analysis may include trichoscopic and trichographic analysis in combination with machine learning techniques, self-reported data, image analysis, and/or any other analysis technique described herein.

Image data of a sample may be obtained by a sensor and stored in one or more data stores (e.g., image slices of a larger scan or mapping) that may contain the sensor data. The sensor data may be related to organic material, such as keratinaceous material. For example, a sensor may identify certain features related to one or more hair follicles. The hair follicles may be samples received by an apparatus, which may be part of the system of certain embodiments. The data may come from sensors that receive medical imaging data (e.g., from an MRI, CT, or CAT scan), microscopic image data (e.g., from a sample coupled to an analysis substrate). The sensed data may be analyzed based on one or more features within the sensed data.

Moreover, a need exists for improved system that rapidly process hair follicles for scanning and producing detailed images and/or provide a user interface that allows one or more users (e.g., biologists, doctors, etc.) to provide further processing of the produced images (e.g., microscopic imagery, image slices, photographic imagery, etc.). The improved system may allow users to precisely image the hair follicles to extract detailed microscopic images therefrom. The improved systems described herein can enhance the securing and processing of the fiber (e.g., hair follicle, fur, synthetic fibers) under a microscope such that the fiber is rapidly reviewed, analyzed, and imaged (e.g., photographed). Further, the system can provide user interfaces that allow each user to supply additional information to the one or more images and for that information to be associated with the one or more images for use by other users. Thus, there is a need for user interfaces that allow a user to identify and/or isolate one or more features (e.g., type of hair follicle, length of hair follicle, age of fiber, cross-sectional dimension, source of fiber, color of fiber, pattern of fiber, etc.) within one or more of the images and to communicate that data automatically and/or remotely to a second user. Additionally, there is a need for a system that may allow such data to be accurately and quickly analyzed for recommendation for further action related to the keratinaceous material and/or a donor of the material.

A computer system may receive a plurality of images or other sensed data, such as microscopic images. Machine learning techniques may be used to automatically identify and categorize certain features in the images. For example, machine learning may determine quantitative measures for each of a plurality of characteristics of interest in the images. In the microscopic imagery context, machine learning may be used to identify different features of interest and/or combinations of features of interest, such as features that may be indicative of a level of damage of the fiber and/or keratinaceous material, such as hair follicles or nails. In some implementations, the presence of certain hair types, for example, or cross-sectional dimensions may be part of the input image data because each image data may reflect a different protein.

Systems and methods described herein may include but are not limited to survey collection, biological sample collection, survey processing, sample processing, automated image analysis, machine learning, tooling and equipment, and user interfaces, such as for communicating analyzed findings with a remote computing device.

In some embodiments, the system may include one or more devices for improving the quality of the imagery and/or analysis of the samples. For example, a system may include a cleaning apparatus, a fixturing and/or alignment apparatus, a user interface, and/or other elements described herein. Although various types of fibers and/or keratinaceous material may be analyzed, for convenience hair follicles will be discussed at length for illustration purposes.

In some embodiments, imagery may be obtained directly from the hair follicle sample. The hair follicle sample may include one or more hair follicles. Additionally, or alternatively, follicle "casts" may be used in the analysis. Follicular casts may include accumulation of keratosebaceous substance identifiable around the follicle. Such casts may indicate one or more aspects of a follicle such as being associated with a follicular disorder. Such disorders may include abnormal follicular keratinization and/or diseases such as folliculitis, demodicosis, follicular dysplasia, endocrinopathies, or sebaceous adenitis.

FIG. 1 shows a block diagram of an analysis system 100 for obtaining imagery of the keratinaceous sample (e.g., follicle sample) or other fiber sample, analyzing the sample, and/or communicating results of the analysis of the sample.

For convenience in discussion, an example of a hair follicle sample may be described although other types of keratinaceous samples and/or fibers may be used. Hereinafter, the keratinaceous sample, the fiber sample, the follicle hair sample, or the follicle sample can each be simply referred to as a sample. The analysis system 100 may also be referred to as a fiber analysis system, analysis system, or simply system.

The analysis system 100 may be configured to capture and microscopically analyze an elongate fiber. The analysis system 100 may include an image sensor 102, a cleaning apparatus 104, a fixturing apparatus 106, a first fiber scanner 108, a second fiber scanner 110, an analysis tube 112, a data interface 114, a memory 116 (e.g., non-transitory memory), and/or a processor 118 (e.g., an electronic processor). The analysis system 100 may comprise some other components/elements as well or include only a portion of those elements listed, without departing from the scope of the disclosure.

The image sensor 102 may be configured to obtain high-detail imagery, such as microscopic imagery, of a portion of the sample (e.g., elongate fiber) disposed within a sensing region. The image sensor 102 may be configured to obtain one or more images of a sample, such as hair follicle sample, at different locations, angles, lightings, and/or other settings associated with the sample. In some embodiments, the image sensor 102 may comprise a microscope. In some embodiments, the image sensor 102 may include, but is not limited to, a Charge-Coupled Device (CCD) Sensor, a Complementary Metal-Oxide-Semiconductor (CMOS) Sensor, an Electron-Multiplying CCD (EMCCD) Sensor, a Scientific Complementary Metal-Oxide-Semiconductor (sCMOS) Sensor, a Photomultiplier Tube (PMT), and/or other sensors.

The cleaning apparatus 104 may be configured to clean the sample. The cleaning apparatus 104 may include mechanical cleaning equipment that is configured to physically remove impurities, such as debris, dust, sand, organic material (e.g., live or dead cells), and/or other impurities from the sample. Additionally, or alternatively, the cleaning apparatus 104 may include a chemical cleaning apparatus. The chemical cleaning apparatus may include a chemical solution configured to dissolve the impurities from the sample and/or decouple (e.g., suspend, disassociate, disconnect, extract, etc.) the impurities from the sample for ease of removal. The cleaning apparatus 104 may be configured to promote improved image quality of the imagery obtained by the image sensor 102. Such cleaning may improve the ultimate analysis and assessment of the analysis system 100.

The fixturing apparatus 106 may include a fixturing tool and/or alignment tool. The fixturing apparatus 106 may include one or more receptacles configured to fix the sample in place. In some embodiments, the fixturing apparatus 106 may be configured to align each of the individual elements (e.g., follicles) of the sample. Such alignment of each of the elements of the sample may promote improved image quality of each element. Additionally, or alternatively, alignment may promote improved comparison imagery of different elements with a sample. For example, it may be advantageous to obtain imagery of a common aspect (e.g., distance from the element, angle of the element, position of the element, etc.) across all elements of the sample. Further, the fixturing apparatus 106 may allow for imagery of each element of the sample under common conditions (e.g., lighting, timing of image, etc.). As discussed below, the fixturing apparatus 106 may include the analysis tube 112 and/or a tube coupler (e.g., tuber coupler 232).

Further, the analysis system 100 may include a fiber analysis coupling which may be referred to as the fiber scanner 108, 110. The fiber scanner 108, 110 may be a device controlled by a microcontroller (not shown) and configured to provide an enhanced scan of the sample utilizing less time compared to conventional scanners. Additionally or alternatively, the fiber scanner 108, 110 may capture images instantaneously using a mechanical operation. For example, the fiber scanner 108, 110 may allow a user to capture multiple images (e.g., 10 images) of an elongate sample (e.g., a 2-foot-long sample) in under a threshold time (e.g., under 6 seconds, under 30 seconds).

The fiber scanner 108, 110 may be a device configured to capture images of the sample at frequent intervals in under the threshold time. For example, the fiber scanner 108, 110 may allow the user to capture 10 images of the sample approximately 2-foot-long sample at 2 inches' intervals in under 4 minutes.

In some embodiments, the fiber scanner 108, 110 is configured to be installed over or otherwise coupled to the image sensor (e.g., microscope) for analyzing the sample underneath the image sensor 102. The fiber scanner 108, 110 may also be used to scroll (feed) the sample to an imaging or sensing region (e.g., underneath the image sensor 102) to obtain sharp microscopic images along an entire length of the sample using the image sensor 102. The fiber scanner 108, 110 can improve the securing and scrolling of the sample under the image sensor such that the sample is rapidly reviewed, analyzed and/or imaged (e.g., photographed).

The analysis tube 112 may be configured to be placed along with the fiber scanner 108. The analysis tube 112 may be configured to securely hold the sample within the sensing region (e.g., underneath the image sensor 102). Due to the small size of the sample and the sensing region, in some embodiments, it may be advantageous to hold the sample in a steady position while balancing speed of the processing. The analysis tube 112 can help secure a target portion of the sample within the sensing region to ensure that while the fiber scanner 108, 110 scrolls the sample, a portion of the sample constantly is within the sensing region, such that clear images may be captured while reducing distortions by the image sensor 102. The analysis tube 112 may be configured to hold the sample at the proper location consistently during periodic scanning of the sample and to allow the image sensor 102 to image the sample at different locations along the sample without having to refocus or reposition the image sensor 102. The analysis tube 112 will be described in more detail below.

The data interface 114 may be in communication with the image sensor 102 (as well as other elements of the analysis system 100) and a data source 120 and/or a remote computing device 122. The data interface 114 may be configured to transmit data containing the image captured by the image sensor 102 to the remote computing device 122. Further, data interface 114 may also be configured to transmit the data stored with the data source 120 to the remote computing device 122. For example, the data interface 114 is configured to receive data related to the sample from the data source 120. The data may include descriptors (e.g., follicle descriptors). The descriptors may be obtained via survey results from a donor of the sample. For example, the descriptors may be related to one or more of a follicle type of the hair follicle sample, a length associated with the hair follicle sample, an age of a donor of the hair follicle sample, a cross-sectional dimension (e.g., width, depth, circumference, diameter, etc.) associated with the hair follicle sample, a medical condition associated with the donor of the hair follicle sample, a curliness of the hair sample, a rigidness of the hair follicle sample, a surface roughness of the hair follicle sample, and/or any other hair follicle descriptor. The data interface 114 may communicate with the image sensor 102 and the data source 120 via a data connection, which may be wired and/or wireless.

As discussed above, the data interface 114 may be in communication with the remote computing device 122, such as a user device, a remote server, a remote database, etc. The data interface 114 may communicate with the remote computing device 122 via the data connection, which may be wired and/or wireless. In some embodiments, the remote computing device 122 may be any computing device such as a desktop, laptop or tablet computer, personal computer, tablet computer, wearable computer, server, personal digital assistant (PDA), PDM, hybrid PDA/mobile phone, mobile phone, smartphone, set top box, voice command device, digital media player, and the like. The remote computing device 122 may execute an application (e.g., a browser, a stand-alone application) that allows a user to access and interact with interactive graphical user interfaces as described herein. In some embodiments, the remote computing device 122 may also be configured to display an image data of the sample captured by the image sensor 102 as described in the following embodiments.

In some embodiments, the remote computing device 122 may also include a network. The network may be a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some implementations, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network may use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. The network may comprise the "cloud." The network may include a remote computing environment.

The memory 116 may be any type of main memory that may be configured to communicate instructions to the processor 118 and receive executed instructions from the processor 118. Types of memory include, a random access memory ("RAM") and read only memory ("ROM"). Other embodiments may be envisioned that incorporate other types of memory 116 in the analysis system 100. The memory 116 may be any type of computer storage that may receive data, store data, and transmit data to other elements of the analysis system 100 (e.g., via a bus). Types of storage that may be used in the memory 116 include, a magnetic disk memory, an optical disk memory, and a flash memory.

In some embodiments, the memory 116 may include a trained machine learning model 124 stored thereon. As shown, the trained machine learning model 124 may be in operative communication with the analysis system 100 via the data connection. Although the trained machine learning model 124 may be separate (e.g., remote) from the analysis system 100 as shown in FIG. 1, in some embodiments the trained machine learning model 124 may be included in the analysis system 100.

Systems and techniques are described herein that use modeling systems and machine learning for identifying one or more features of keratinaceous material or other fiber material, such as hair follicles. The modeling systems may include a machine learning model trained on samples that range in degree along many spectra of possible aspects.

The present disclosure describes methods and systems for using deep learning techniques to arrive at a final sample (e.g., hair follicle sample) assessment, alone or in combination with other data (e.g., data from the data source 120). Deep learning techniques in the form of one or more algorithms may be used to analyze the sample. An algorithm may obtain imagery as input data and output a prediction of a condition of the sample. The algorithm may classify a condition of the sample, such as by determining a possible medical condition associated with the sample. The algorithm may utilize a neural network, such as a convolutional neural network (CNN) used for computer vision, or some other machine learning model. The output of the algorithm may be sample-specific and/or may be depend on one or more sample descriptors, such as those received from the data source 120 (e.g., via the data connection).

In some embodiments, the algorithm includes a particle filter that is configured to probabilistically assign a condition that most likely matches or fits with characteristics visible in the imagery. This probabilistic assignment may be based on hundreds, thousands, or even millions of images of other relevant samples as prior information. In some embodiments, the algorithm may be operated in parallel with obtaining images of the sample.

Figure 2A:
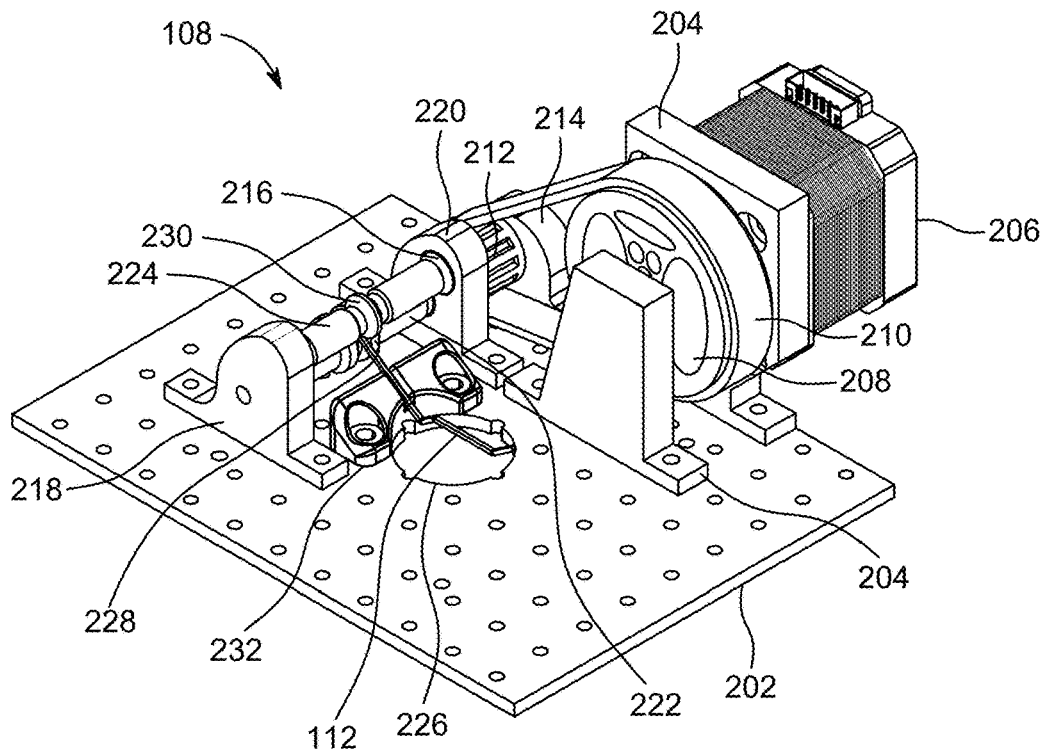
FIG. 2A illustrates an isometric view of an example fiber scanner, according to some embodiments.
Figure 2B:
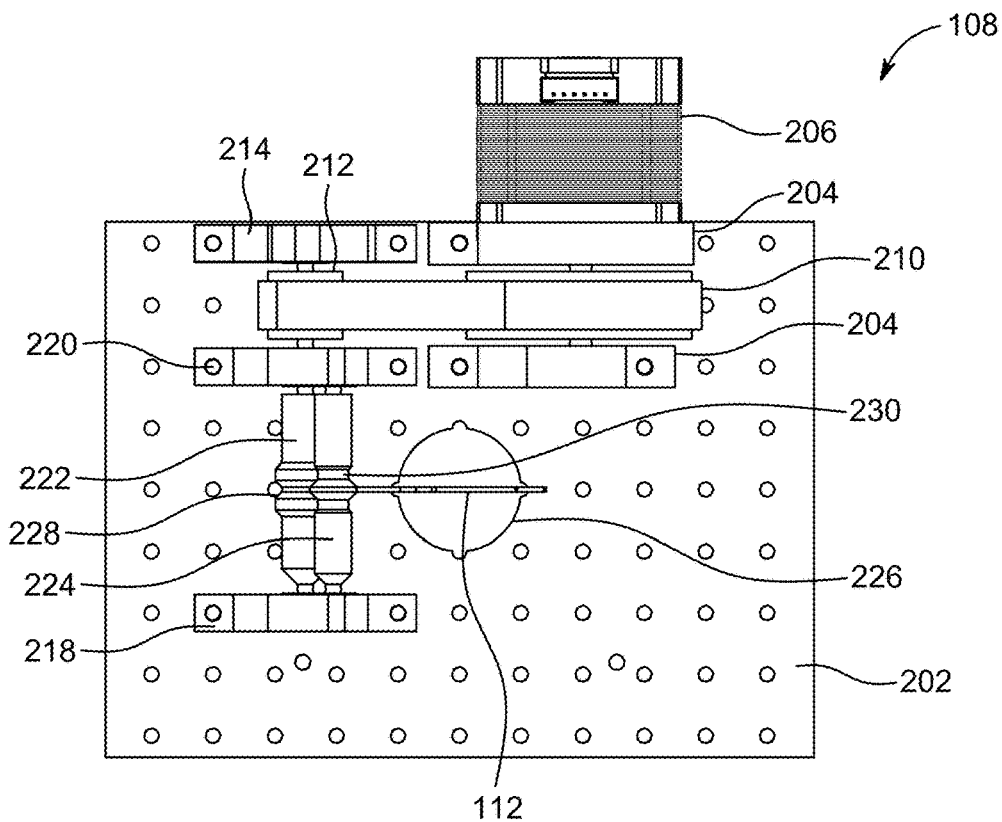
FIG. 2B illustrates a top view of the fiber scanner of FIG. 2A.
Figure 2C:
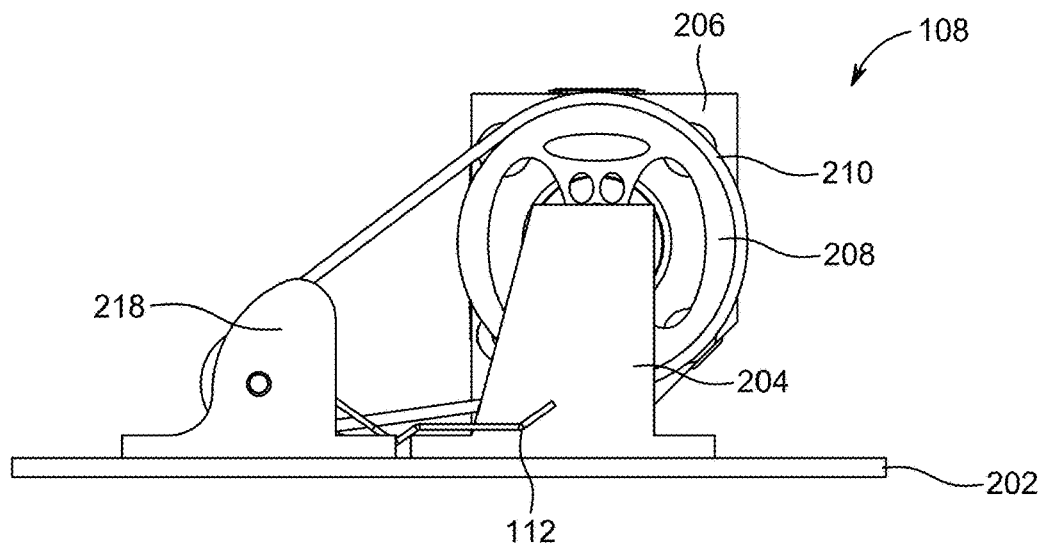
FIG. 2C illustrates a side view of the fiber scanner of FIG. 2A.

FIG. 2A illustrates an isometric view of the fiber scanner 108, according to some embodiments. FIGS. 2B-2F are described in conjunction with FIG. 2A. The fiber scanner 110 may be referred to as a fiber analysis coupling or an analysis coupling.

As shown in FIG. 2A, the fiber scanner 108 comprises of a modular base plate 202, a motor mount 204 i.e. one or more mounts or motor mountings, a motor 206 (e.g., a stepper motor), a gear 208 having an actuator (not shown), a timing belt 210, a pinion 212, a pinion roller base 214, a ball bearing 216, an outer roller base 218, an inner roller base 220, a driving roller 222 (e.g., an elongate driving roller), a free roller 224 (e.g., an elongate free roller), an opening 226, a groove 228, a collar 230, and an analysis tube coupler 232.

The modular base plate 202 may be configured to allow the fiber scanner 108 to be installed over the image sensor (e.g., microscope) (not shown) and/or a stage thereof. In some embodiments, the image sensor is a microscope, so for convenience reference to a microscope will frequently be used, although non-microscope embodiments ma include many of the features described otherwise. The stage of the microscope is the region where the image sensor 102 may be focused to capture images of the sample. The modular base plate 202 may be a hard flat sheet made up of metal or non-metal components. Further, the modular base plate 202 may be configured in, but not limited to, a rectangular shape, a square shape, or a circular shape. Further, the modular base plate 202 may be fabricated with the opening 226 configured to allow passage of light emitted from the image sensor 102 and illuminate the sample. The attachment of the fiber scanner 108 with the microscope allow the fiber scanner 108 to hold and/or scroll the sample within a sensing region (e.g., underneath the image sensor 102) in a specified speed required by a user. Thus, the modular base plate 202 thereby allows the image sensor 102 to capture detailed microscopic images of the sample.

The motor mount 204 may be configured to install the motor 206 over the modular base plate 202. In some embodiments, the motor mount 204 may be screwed along with the modular base plate 202 to affix the position of the motor 206. Further, the motor 206 may also be screwed with the motor mount 204 to affix the position of the motor 206 with respect to the modular base plate 202. The screwing of the motor mount 204 with the modular base plate 202 and the motor 206 may eliminate vibrations along the fiber scanner 108 while the motor 206 is actuated.

Further, the motor 206 may be configured to provide mechanical movement to the sample to scroll underneath the image sensor 102. The motor 206 used herein spins in a direction in set increment or in a discrete step. In some embodiments, the motor 206 contains a shaft 234 (shown in FIG. 2D) that rotates at a predefined speed. In some embodiments, the motor 206 may be coupled electrically to a button. When the button is pressed by the user, the shaft 234 gets actuated to spin in a defined increment. Further, the shaft 234 is linked with the gear 208. In some embodiments, the gear 208 may also be termed as a gear. The gear may be configured to rotate along the same rotational direction of the shaft 234. The gear 208 is fabricated with a plurality of gear treads 236 (shown in FIG. 2D) along the periphery of the gear 208. It should be noted that the plurality of gear trends 236 correspond to grooved steps along the periphery of the gear 208. The timing belt 210, at one end, is mounted over the plurality of gear treads 236, and at other end, over the pinion 212. As the motor 206 gets actuated, the shaft 234 rotates the gear 208. The frictional force established due to the plurality of gear treads 236 allows the timing belt 210 to grip the surface of the gear 208 and thereby rotate.

The pinion 212 may be installed over the modular base plate 202 with the help of the pinion roller base 214. In some embodiments, the timing belt 210 may be configured to translate the rotational motion of the shaft 234 to the pinion 212. The pinion 212 may be configured with the ball bearing 216 that allows the rotational motion of the pinion 212 with respect to the pinion roller base 214. The ball bearing 216 helps to maintain a gap between the pinion 212 and the pinion roller base 214 and decrease frictional force such that the pinion 212 may rotate. The ball bearing 216 may comprise a plurality of metal balls (not shown) that rotate in same direction (and/or opposite directions in some embodiments) to provide overall rotational movement to the pinion 212.

Figure 2D:
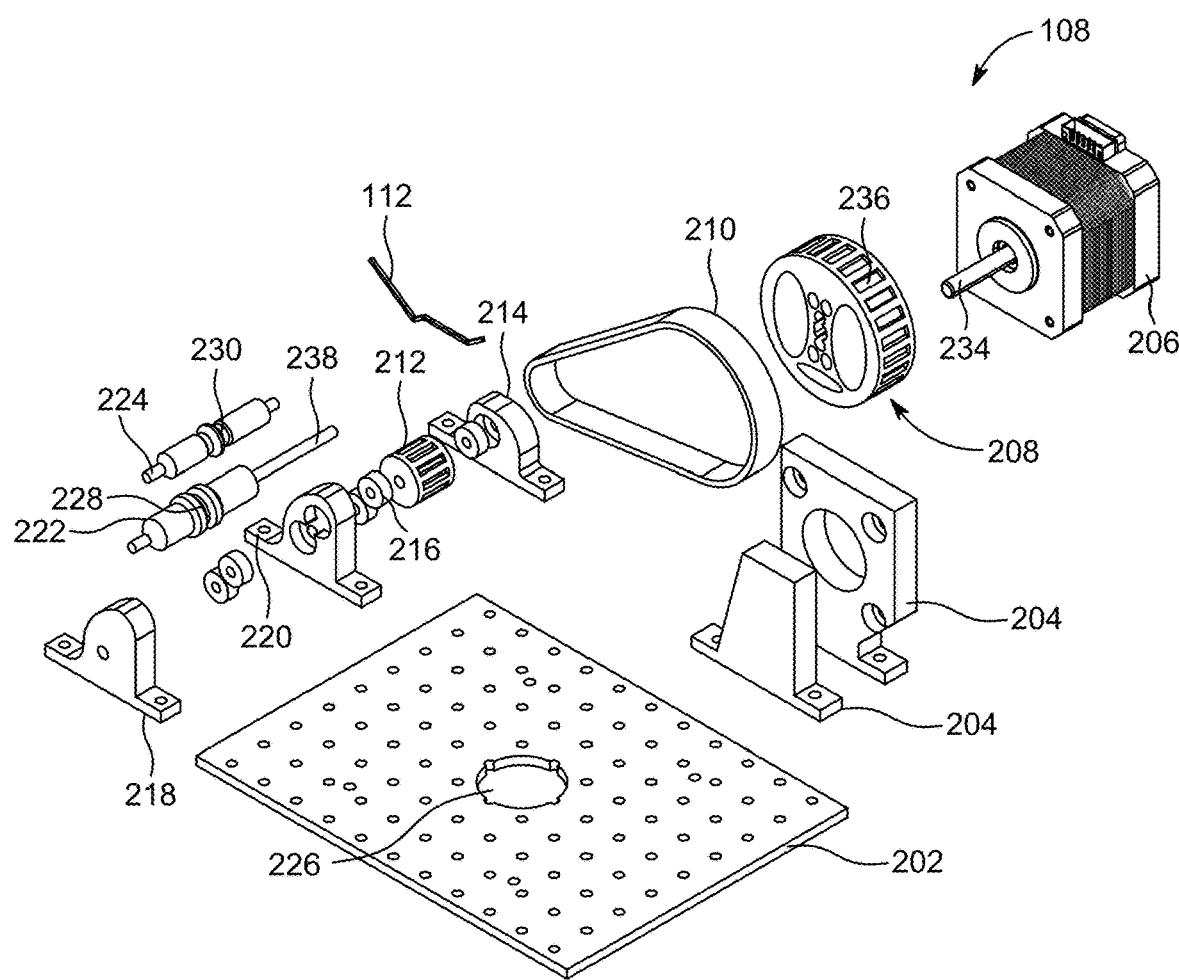
FIG. 2D illustrates an exploded view of the fiber scanner of FIG. 2A.
Figure 2E:
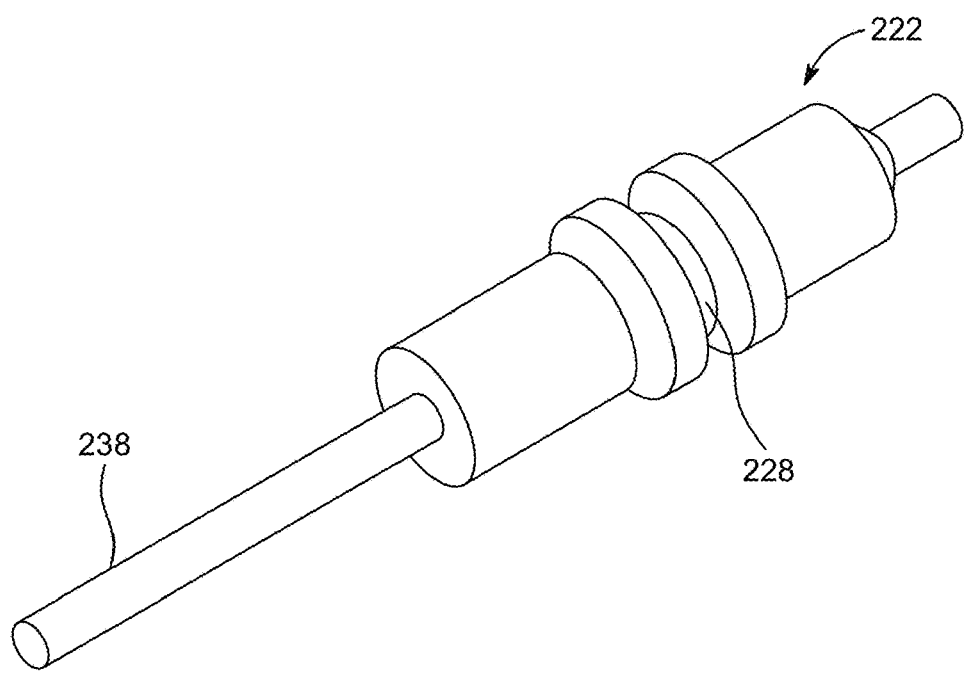
FIG. 2E illustrates a perspective view of a driving roller, according to some embodiments.

Further, the modular base plate 202 may be installed with the outer roller base 218 and the inner roller base 220. The outer roller base 218 and the inner roller base 220 may be configured to mount the driving roller 222 and the free roller 224 over the modular base plate 202. The driving roller 222 may be configured to rotate along with the rotation of the pinion 212 at the same direction. Further, the driving roller 222 may comprise a sleeve 238 extending radially, as shown in FIGS. 2D and 2E. The sleeve 238 may be configured in a manner such that one end of the sleeve 238 is attached to the driving roller 222 and other end is attached with the pinion 212. As the pinion 212 rotates, the sleeve 238 may also rotate and thereby impart rotational movement of the driving roller 222 in the same direction. In an embodiment, the driving roller 222 may be fabricated with the groove 228. The groove 228 may be fabricated radially along the driving roller 222. The groove 228 may be configured to provide a cavity for placing the sample. The cavity stops any lateral movement to the sample while being scrolled by the driving roller 222.

Further, the driving roller 222 may drive the free roller 224. The free roller 224 may be installed parallel to the driving roller 222. The free roller 224 may be configured to rotate about an axis parallel to a drive axis in response to rotation of the driving roller 222. In some embodiments, the free roller 224 may be positioned in a manner that, a gap may be left between the free roller 224 and the driving roller 222 to pass the analysis tube 112 containing the sample. Further, the free roller 224 may be fabricated with the collar 230. The collar 230 may be extending radially from the free roller 224. The collar 230 may be formed to be in synchronization with (e.g., fit within) the groove 228 to couple to the sample while also providing space for equipping the analysis tube 112. The collar 230 may have a cross-sectional shape of a triangle, a semi-ellipse (e.g., semi-circle), a rectangular, and/or other shape. The groove 228 may form negative space having a cross-sectional shape of a triangle, a semi-ellipse (e.g., semi-circle), a rectangular, and/or other shape. The cross-sectional shape of the collar 230 and of the negative space of the groove 228 may be complimentary of each other, so as to better capture and/or scroll the sample.

Further, the free roller 224 may be provided with an adhesive layer. The adhesive layer may allow the free roller 224 to adhere one end of the analysis tube 112. Once the analysis tube 112 is securely placed in between the free roller 224 and driving roller 222, the analysis tube 112 is set at its target position to get scrolled for analysis. It may be noted that the gap left between the driving roller 222 and the free roller 224 may be such that only the analysis tube 112 may be placed in between. After the placement of the analysis tube 112, the driving roller 222 and the free roller 224 are in contact via the sample at the same time. In some embodiments, the gap between the driving roller 222 and the free roller 224 may be adjustable based on the size of the analysis tube 112.

Figure 2F:
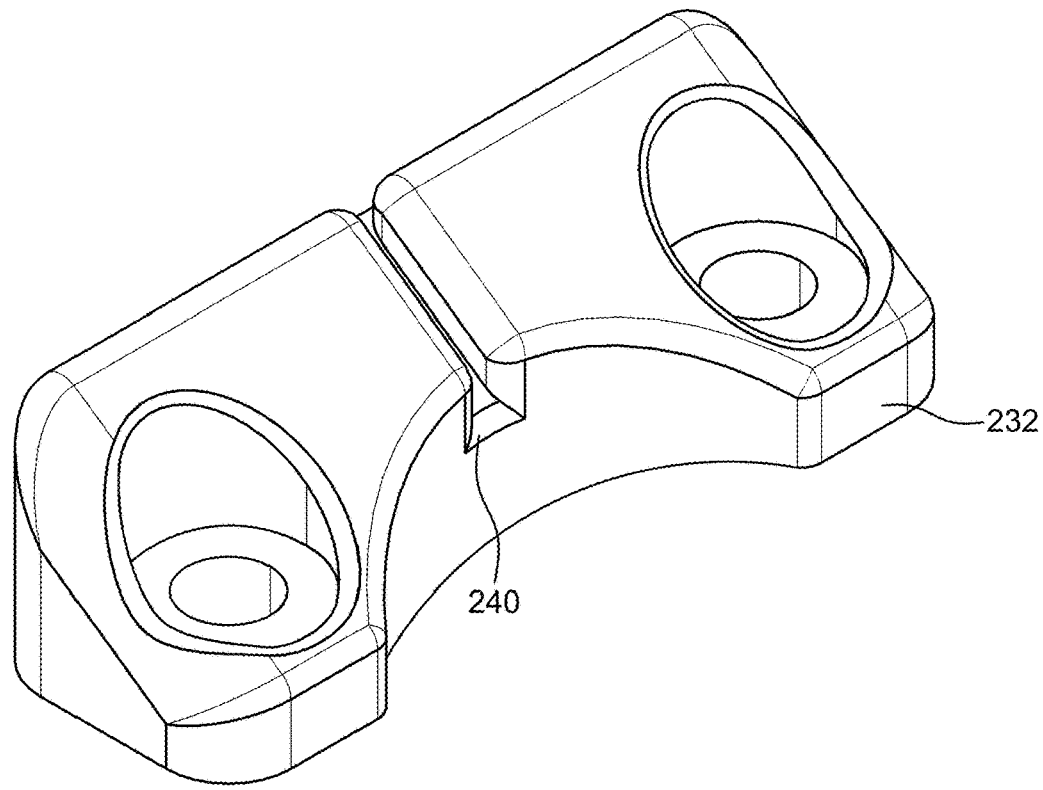
FIG. 2F illustrates a perspective view of an analysis tube coupler, according to some embodiments.

Further, the analysis tube coupler 232, as shown in FIG. 2F, may be configured to equip the analysis tube 112. The analysis tube 112, as shown in FIG. 3D, may comprise an aperture (not shown) and a first segment 902 and second segment 904 separated by a tube bend 906, as shown in FIGS. 9A-9E, described in later part of the detailed description. In some embodiments, the analysis tube 112 may be referred as a double bend tube, a triple bend tube, an elongate tube, an asymmetric tube, or similar, based on the shape and/or orientation of the analysis tube 112. The analysis tube 112 may be configured to be positioned within the analysis tube coupler 232. The driving roller 222 may rotate and draw the elongate fiber or other sample into the aperture of the analysis tube 112. A tube bend 906 is shaped to cause the elongate fiber to be disposed along an interior surface of the analysis tube 112 within the sensing region.

In some embodiments, the analysis tube coupler 232 may be configured to fix the position of the analysis tube 112 within the analysis tube coupler 232 to secure or otherwise couple the two together to eliminate any lateral movement. The coupling between the analysis tube coupler 232 an the analysis tube 112 may be a friction fit, an adhesive, a screw coupling, or any other coupling. The analysis tube coupler 232 may include a channel 240 (shown in FIG. 2F) that enables the analysis tube 112 to be positioned securely within the analysis tube coupler 232 (e.g., via friction fit).

The channel 240 may be a carved out portion within the analysis tube coupler 232 that provides cavity to place the analysis tube 112 securely. Additionally or alternatively, the channel 240 is molded into the analysis tube coupler during fabrication.

Figure 3A:
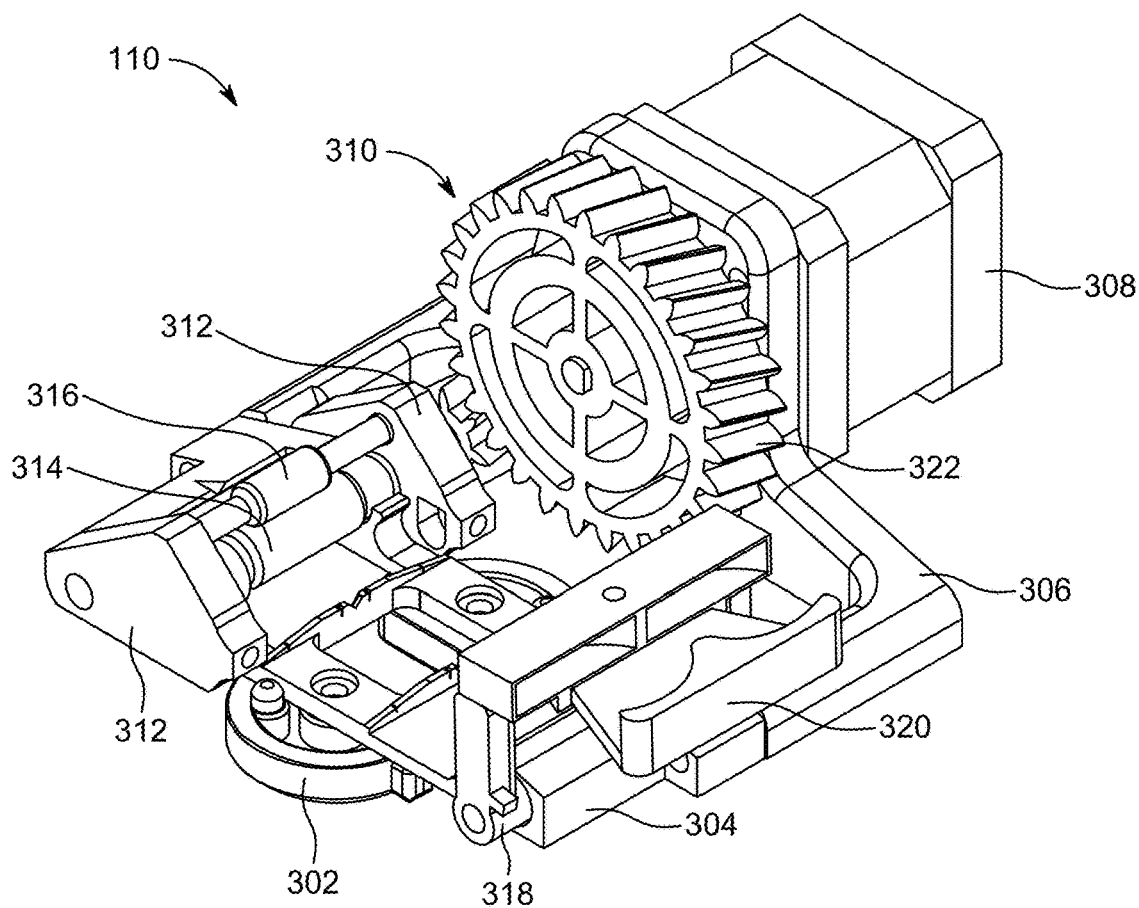
FIG. 3A illustrates an isometric view of another example fiber scanner, according to some embodiments.
Figure 3B:
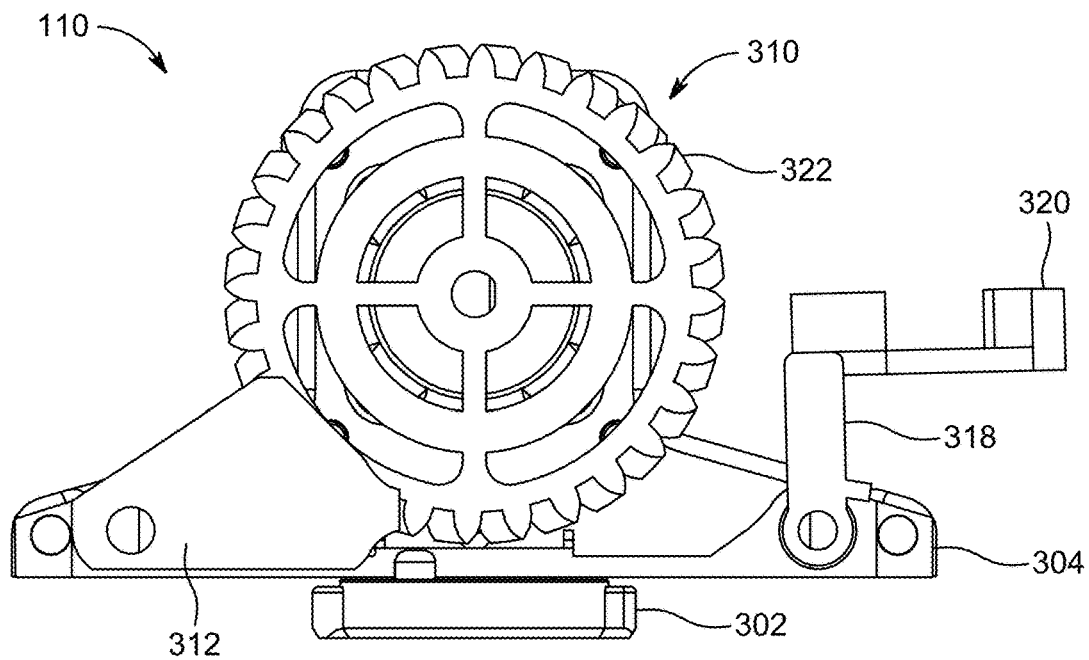
FIG. 3B illustrates a side view of the fiber scanner of FIG. 3A.
Figure 3C:
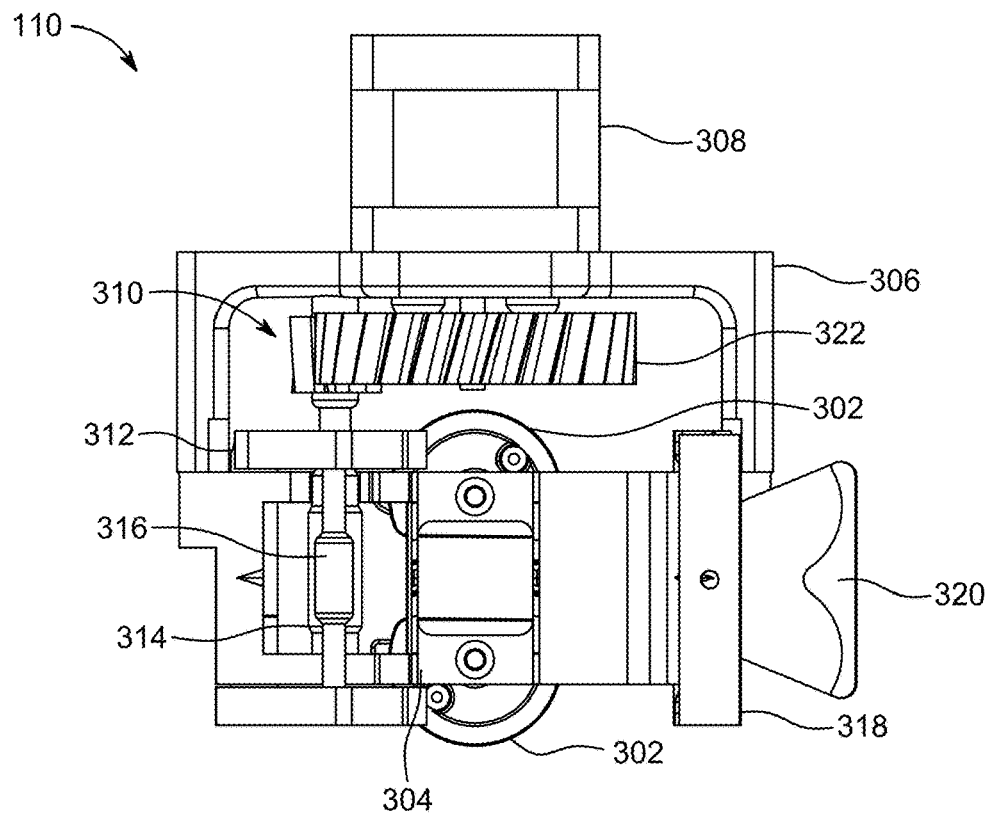
FIG. 3C illustrates a top view of the fiber scanner of FIG. 3A.
Figure 3D:
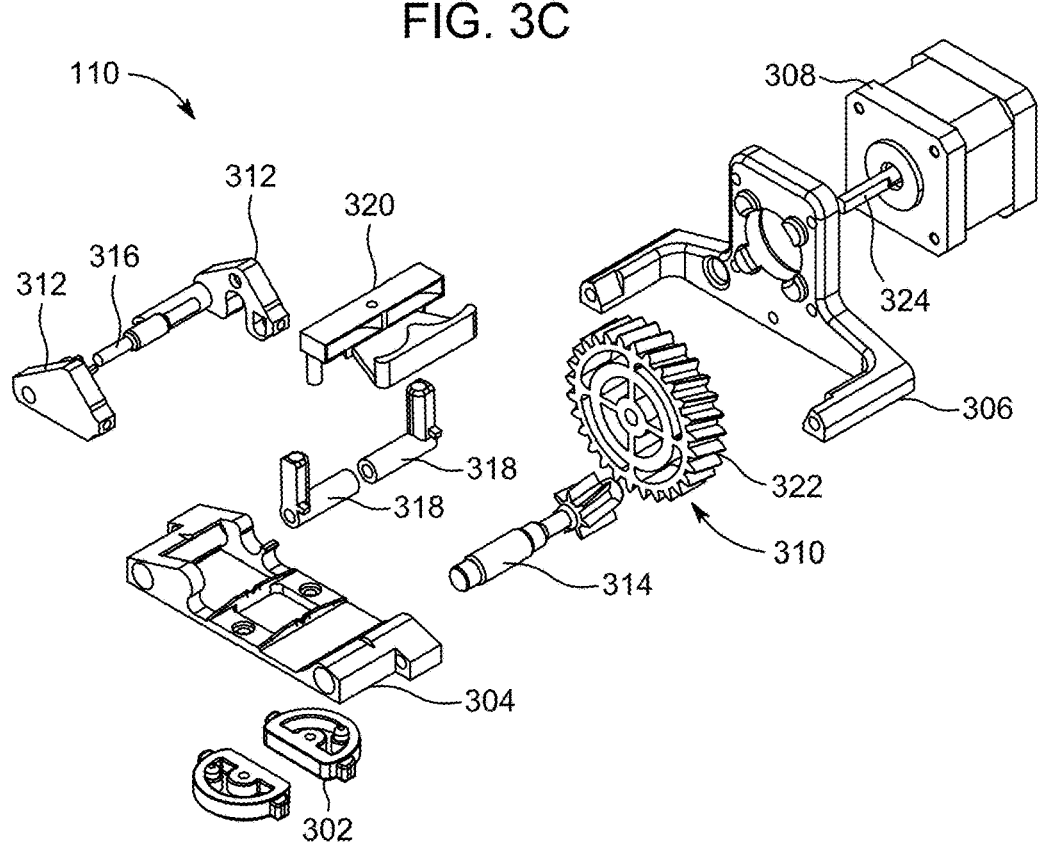
FIG. 3D illustrates an exploded view of the fiber scanner of FIG. 3A.

FIG. 3A illustrates an isometric view of the fiber scanner 110, according to some embodiments. FIGS. 3A-3D are described in conjunction with FIG. 3A.

The fiber scanner 110 comprises of a rotating clamp 302, a base 304, a motor mount 306 (e.g., a mount), a motor 308 (e.g.) a stepper motor, a gear 310, an inner and outer pressure arm 312, a motorized pinion roller 314 (e.g., an elongate driving roller), a pressure roller 316 (e.g., an elongate free roller), an inner and outer pressure pivot 318, a soft hug 320, and a plurality of gear treads 322.

The rotating clamp 302 may be installed underneath the base 304 of the fiber scanner 110. For example, in some embodiments, the rotating clamp 302 may be disposed such that a portion of the image sensor 102 (e.g., an analysis surface, which may comprise a transparent or translucent material such as glass or plastic) may be disposed between the rotating clamp 302 and other elements of the fiber scanner 110. In some embodiments, the rotating clamp 302 may be configured to securely attach the other elements of the fiber scanner 110 over the microscope, while the sample is being analyzed. It may be noted that the number of rotating clamps 302 may not be limited to a fixed number. The number of rotating clamps 302 may be based on the size of the microscope, against which the fiber scanner 110 may be secured or otherwise coupled. For example, the fiber scanner 110 may include one, two, three, four, or more rotating clamps 302. The rotating clamp 302 may be configured to slide into an opening of the microscope. In some embodiments, when the fiber scanner 110 is parallel and flush with the microscope, the rotating clamp 302 may be rotated. Further, the rotation of the rotating clamp 302 may ensure that the fiber scanner 110 may be secured with the microscope.

In some embodiments, the rotating clamp 302 may allow the fiber scanner 110 to grip the microscope from at least two sides. Further, one side of the at least two sides may be located near the position of the motorized pinion roller 314 and the pressure roller 316. Further, another side of the at least two sides may be located near to a non-motorized roller (not shown). The rotating clamp 302 may be configured to be lifted up and dropped down when the fiber scanner 110 is set in a desired position. In some embodiments, the rotating clamp 302 may be further secured with weights such that the position of the base 304 of the fiber scanner 110 is affixed with the microscope. Further, when the sample is in place and the fiber scanner 110 is clamped down, the sample may only move in sideways direction only.

The base 304 may be mounted with the motor mount 306. The motor mount 306 may be configured to install the motor 308 over the base 304 of the fiber scanner 110. Further, the motor 206 may be configured to provide mechanical movement to the sample to scroll underneath the image sensor 102. The motor 308 used herein spins in a direction in set increment or in a discrete step. In some embodiments, the motor 206 may contain a shaft 324, as shown in FIG. 3D, that rotates at a predefined speed. In some embodiments, the motor 308 may be coupled electrically to a button (not shown). For example, when the button is pressed by the user, the shaft 324 gets actuated to spin in a defined increment. Further, the shaft 324 may be linked with the gear 310. The gear 310 may be configured to rotate along the same rotational direction of the shaft 324. In some embodiments, the gear 310 may also be termed as a gear. The gear 310 may be fabricated with the plurality of gear treads 322.

Further, the base 304 may be mounted with the outer pressure arm 312. The outer pressure arm 312 may be configured to install the motorized pinion roller 314 and the pressure roller 316 over the base 304. The gear 310 may be coupled to the motorized pinion roller 314. One end of the motorized pinion roller 314 and the gear 310 may be fabricated with gear profiles. The gear profiles help the gear 310 to engage with gear profiles of the motorized pinion roller 314. Due to the mesh between the gear profiles, the motorized pinion roller 314 may also rotate along with the gear 310. It can be noted that the rotational speed of the motorized pinion roller 314 may be configurable based on the ratio of the gear profiles fabricated over the motorized pinion roller 314 and the gear 310.

The motorized pinion roller 314 further drives the pressure roller 316. The pressure roller 316 is installed in parallel to the motorized pinion roller 314. The pressure roller 316 is positioned in a manner that, a gap is left between the pressure roller 316 and the motorized pinion roller 314 to pass the sample. In some embodiments, the pressure roller 316 may be applied with an adhesive layer or other coupling agent. The coupling agent may allow the pressure roller 316 to be drawn to (e.g., adhere) one end of the sample. Once the analysis tube 112 may be securely placed in between the pressure roller 316 and the motorized pinion roller 314, the analysis tube 112 may set at its target position to get scrolled for analysis. It may be noted that the gap left between the motorized pinion roller 314 and the pressure roller 316 is such that only the analysis tube 112 may be placed in between. After the placement of the analysis tube 112, the motorized pinion roller 314 and the pressure roller 316 are in contact via the analysis tube 112 at the same time. In some embodiments, the gap between the motorized pinion roller 314 and the pressure roller 316 may be adjustable based on the size of the sample.

Further, the non-motorized roller (not shown) may be placed opposite to the driving roller and the free roller. The non-motorized roller may be installed over the base 304 via the inner and outer pressure pivot 318. For example, when the analysis tube 112 is scrolled by the motorized pinion roller 314 and the pressure roller 316, the analysis tube 112 gets collected in the opposite side by the non-motorized roller. The non-motorized roller again rolls the sample along the circumference, such that the analysis tube 112 is collected easily by the user. Further, the soft hug 320 may be configured to keep weight such that the position of the base 304 of the fiber scanner 110 is affixed with the microscope. Further, the inner and outer pressure pivot 318 may be configured to anchor the soft hug 320 from both sides. In some embodiments, the fiber scanner 110 may be referred to as the fiber analysis coupling. The fiber scanner 108 or the fiber scanner 110 may be installed over (e.g., on top of) the microscope. In some embodiments, the fiber analysis coupling may be coupled to and decoupled from the microscope. In some embodiments, the fiber scanner 108 may allow a user to capture 10 images of the sample of 2-foot-long sample in approximately 6-30 seconds. Further, the fiber scanner 110 allows the user to capture 10 images of the sample approximately 2-foot-long sample at 2 inch intervals in under 4 minutes. The fiber scanner 108, 110 may be configured to scan images of the sample at a rate of more than about 1 per minute, about 2 per minute, about 3 per minute, about 4 per minute, about 5 per minute, about 6 per minute, about 8 per minute, about 10 per minute, about 12 per minute, about 15 per minute, about 20 per minute, about 24 per minute, about 30 per minute, any rate therebetween, or within any range having endpoints therein.

Figure 4:
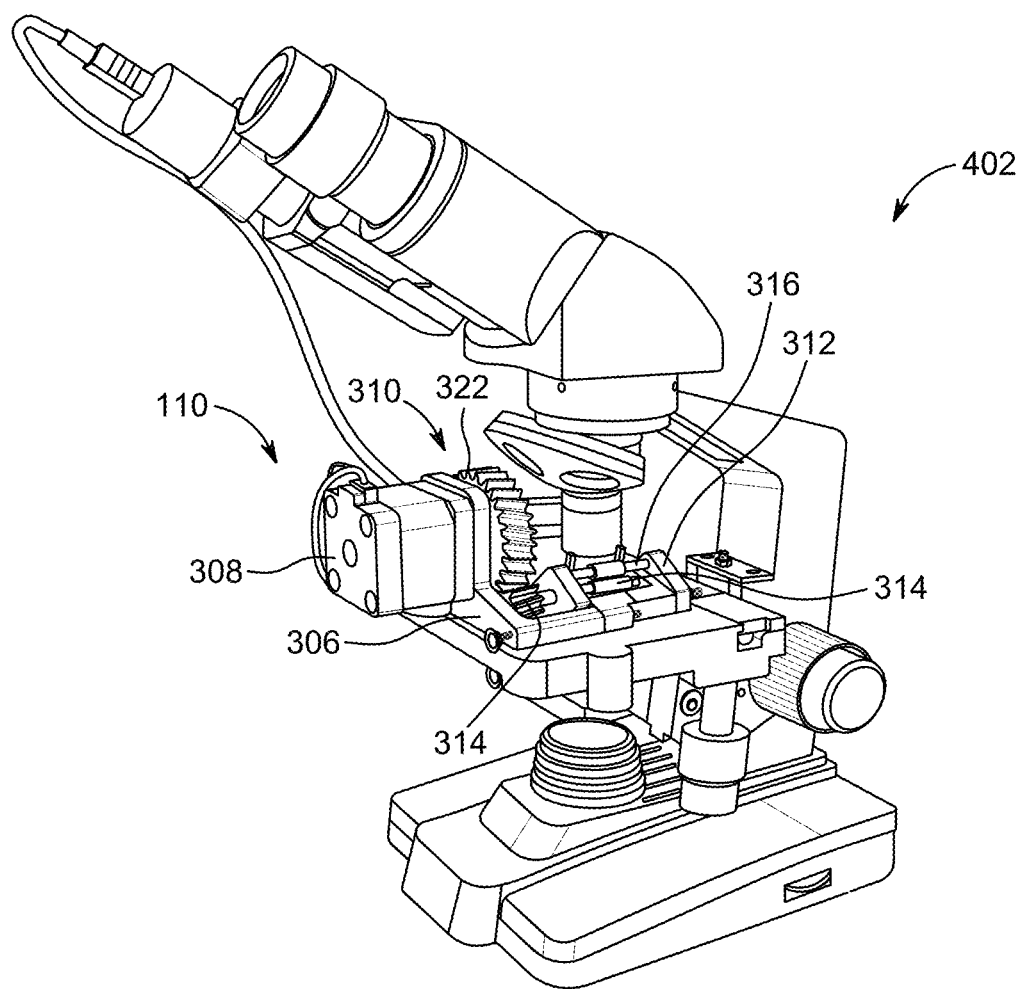
FIG. 4 illustrates the fiber scanner of FIG. 3A coupled to an image sensor, according to some embodiments.

FIG. 4 illustrates the fiber scanner 110 installed to a microscope 402, according to some embodiment. FIG. 4 is described in conjunction with FIGS. 3A-3D.

The fiber scanner 110 may be attached to the microscope 402 through the rotating clamp 302. As discussed, the rotating clamp 302 may be configured to securely attach the fiber scanner 110 over the microscope 402, while the sample within the analysis tube 112 is being observed. The rotating clamp 302 may slide into an opening of the microscope 402. For example, when the fiber scanner 110 may be placed in parallel and/or flush with a portion of the microscope 402, the rotating clamp 302 may be rotated. Further, the rotation of the rotating clamp 302 may ensure that the fiber scanner 110 is secured with the microscope 402.

In some embodiments, the rotating clamp 302 may allow to grip the microscope 402 from at least two sides. Further, one side of the at least two sides may be located near the position of the motorized pinion roller 314 and the pressure roller 316. Further, other side of the at least two sides may be located near the non-motorized roller (not shown). The rotating clamp 302 may be configured to be lifted up and dropped down when the analysis tube 112 containing the sample is set in desired position. In some embodiments, the rotating clamp 302 may further be secured with weights, such that the position of the base 304 of the fiber scanner 110 may be affixed to the microscope 402. In some embodiments, when the sample is in place and the fiber scanner 110 is clamped down, the sample may only move along one degree of freedom (e.g., sideways).

Further, the microscope 402 may be electrically coupled to a button (or other actuator, such as a switch dial, or the like), the data interface 114, and the processor 118, as described above. In some embodiments, the motor 308 may be coupled electrically to the button. For example, when the button is pressed by the user, the shaft 234 of the motor 308 may get actuated to spin in a defined increment and/or at a defined speed. Further, the processor 118 may be electrically linked with the button. The processor 118 may be configured to control the speed of the motor 308 in set increments when the button is pressed by the user. The processor 118 drives the motorized pinion roller 314 to a first target amount when the button is pressed. Further, the processor 118, upon obtaining microscopic images from the microscope 402, may be configured to automatically cause the motor 308 to drive the motorized pinion roller 314 to a second target amount. The first target amount and the second target amount may be defined as the specific amount of scrolling distance (displacement) which the sample may travel through the analysis tube 112. In some embodiments, the first target amount may be different from the second target amount. In one exemplary embodiment, the first target amount may correspond to the displacement between about 1 cm and about 5 cm of the sample. In some embodiments, the first target amount is different from the second target amount. In an embodiment, the elongate fiber comprises a hair follicle.

It should be noted that the data interface 114 may be in communication with the image sensor 102 and the data source 120. The data interface 114 may be configured to transmit data containing the image captured by the image sensor 102 to the remote computing device 122. As discussed above, the data interface 114 may communicate with the image sensor 102 and the data source 120 via the data connection, which may be wired and/or wireless.

It will be apparent to one skilled in the art the above-mentioned functioning of the fiber scanner 110 installed to a microscope 402 has been provided only for illustration purpose. In some embodiments, the fiber scanner 108 may also be installed to the microscope 402 for determining an assessment of a hair follicle sample, without departing from the scope of the disclosure.

Figure 5:
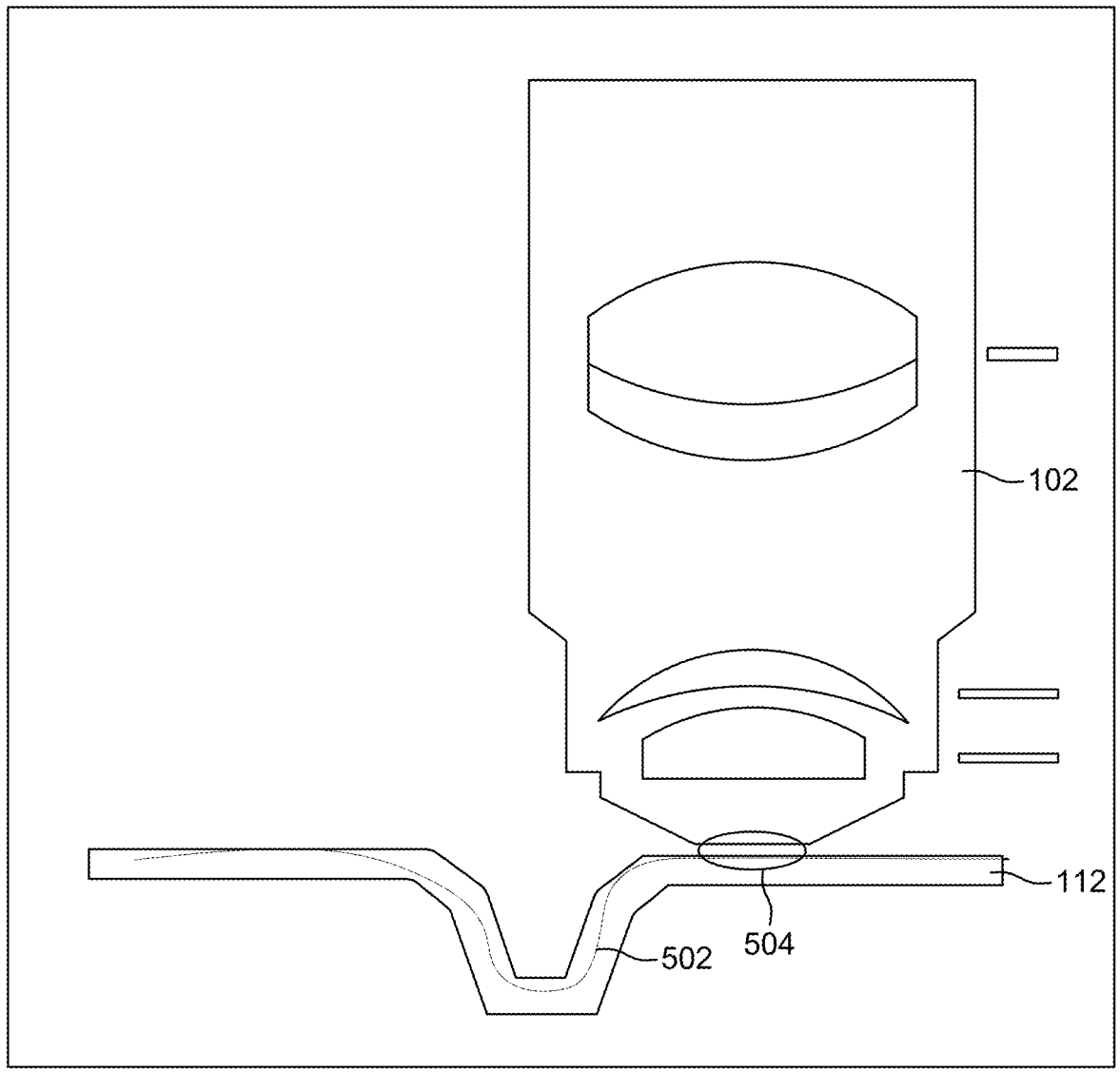
FIG. 5 illustrates a schematic view of an analysis tube containing a sample a sensing region of an image sensor, according to some embodiments.

FIG. 5 illustrates a schematic view of the analysis tube 112 containing a sample 502 through a sensing region 504 of the image sensor 102, according to some embodiments.

The analysis tube 112 may be configured to prevent unwanted movement of the sample 502 when positioned in the sensing region 504 of the image sensor 102. The sensing region 504 may be defined as the point under the microscope 402 where light source is projected. It may be noted that the sensing region 504 may be referred as an observation area. The analysis tube 112 may serve as guide for the sample 502 to pass through this light source. In some embodiments, the analysis tube 112 may be heated and bent at different angles to form a specific geometry. The unique geometry of the analysis tube 112 may restrict movement of the sample against an upper face of the analysis tube 112 proximal to the image sensor 102 of the microscope 402. Such restricted movement of the sample 502 within the analysis tube 112 may reduce or even eliminate re-focusing procedure of the microscope. The geometry of he analysis tube 112 may be depend on the type of sample (e.g., hair follicle, fur, synthetic fiber, etc.) to be analyzed.

In some embodiments, the sample 502 starts to scroll towards the sensing region 504 of the image sensor 102, once the button is pressed by the user. As the sample 502 is scrolled, the sample 502 gets pass through the curvature of the analysis tube 112. The analysis tube 112 thereby provides a guided path for the sample 502 to get placed in the sensing region 504. Further, the button is pressed after an interval of time, a certain length of the sample 502 gets positioned in the sensing region 504, as shown in FIG. 5, and thus allows the image sensor 102 to capture the microscopic images. Once the image is (or images are) taken, the next portion of the sample 502 gets positioned. The analysis tube 112 may be of varied shapes and bends as described in the following embodiments. In some embodiments, the system may automatically image multiple parts of the fiber and/or a single part multiple times automatically (e.g., without user input or control), depending on the instructions stored in the memory 116.

In some embodiments, the method of analyzing the sample by using the fiber scanner 108, may be described. The sample 502 may be placed within the analysis tube 112 and/or in between the free roller 224 and the driving roller 222. The adhesive layer of the free roller 224 can secure the sample 502 to the free roller 224. For example, a human hair strand may be placed over the free roller 224 and affixed with an adhesive. The hair strand may have a dimension (e.g., length) of about 3.4 cm and a diameter of about 0.15 mm.

Successively, activating the motor 206 to scroll the sample under the analysis tube 112 and position the sample under a sensing region 504 for a predefined length. Once the motor 206 is activated by pressing the button, the driving roller 222 and the free roller 224 rotate. The rotational movement of the driving roller 222 and the free roller 224 allows the sample to pass through the curvature of the analysis tube 112. For example, when the button is pressed once, the motor 206 may be activated and allow the hair strand to scroll for a feed distance of 1 cm. Other distances are possible.

The system can successively capture one or more images of the sample for the predefined length via the image sensor 102. For example, the image sensor 102 may capture images in 20 seconds for the 1 cm length of the hair strand. Successively, activating the motor 206 to scroll the sample under the sensing region 504 for an incremented length is possible. For example, the button may be pressed again, activating the motor 206 to feed the hair strand again for the feed distance of 1 cm again. The total feed length of the hair strand may be now 2 cm. Successively, re-capturing the one or more images of the sample for the incremented length until the entire length of the sample is covered. In some embodiments, the geometry and an opening of the analysis tube 112 may be modified in different angles and shapes respectively based on the type of samples, without departing from the scope of the disclosure.

Figure 6:
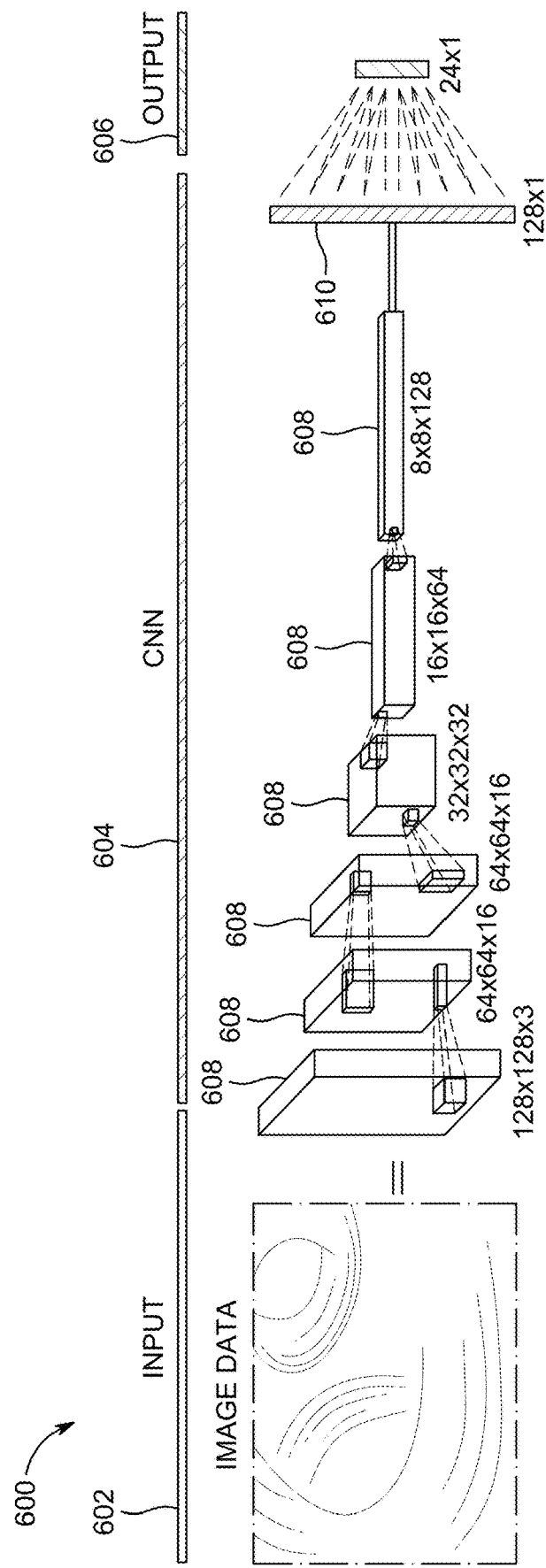
FIG. 6 schematically illustrates an exemplary process of accessing a trained machine learning model, according to some embodiments.

FIG. 6 schematically illustrates an exemplary process 600 of accessing the trained machine learning model 124, according to some embodiments. After images of the samples have been captured as described above, these images may be processed using the trained machine learning model 124. This process may be done automatically in response to receiving the images captured by the image sensor 102.

The process 600 may include receiving an input 602, passing the input 604 through the trained machine learning model 124, for example, a convolutional neural network (CNN), and receiving an output 606. The input 602 may include one or more images or other tensor, such as those captured by an imaging device (e.g., the image sensor 102). The trained machine learning model 124 receives the input 602 and passes it to one or more model layers 608. In some examples, the one or more model layers 608 may include hidden layers and a plurality of convolutional layers that "convolve" with a multiplication or other dot product. Additional convolutions may be included, such as pooling layers, fully connected layers, and normalization layers. One or more of these layers may be "hidden" layers because their inputs and outputs are masked by an activation function and a final convolution.

Pooling layers may reduce the dimensions of the data by combining the outputs of neuron clusters at one layer into a single neuron in the next layer. Pooling may be a form of non-linear down sampling. Pooling may compute a max or an average. Thus, pooling may provide a first approximation of a desired feature, such as a degree of damage to a hair follicle or other sample. For example, max pooling may use the maximum value from each of a cluster of neurons at a prior layer. By contrast, average pooling may use an average value from one or more clusters of neurons at the prior layer. It may be noted that maximum and average pooling are only examples, as other pooling types may be used. In some examples, the pooling layers transmit pooled data to fully connected layers.

Fully connected layers, such as a fully connected layer 610, may connect every neuron in one layer to every neuron in another layer. Thus, fully connected layers may operate like a multi-layer perceptron neural network (MLP). A resulting flattened matrix may pass through a fully connected layer to classify the input 602.

At one or more convolutions, the process 600 may include a sliding dot product and/or a cross-correlation. Indices of a matrix at one or more convolutions or model layers 608 may be affected by weights in determining a specific index point. For example, each neuron in a neural network may compute an output value by applying a particular function to the input values coming from the receptive field in the previous layer. A vector of weights and/or a bias may determine a function that is applied to the input values. Thus, as the trained machine learning model 124 proceeds through the model layers 608, iterative adjustments to these biases and weights results in a defined output 606, such as a location, orientation, or the like.

Figure 7:
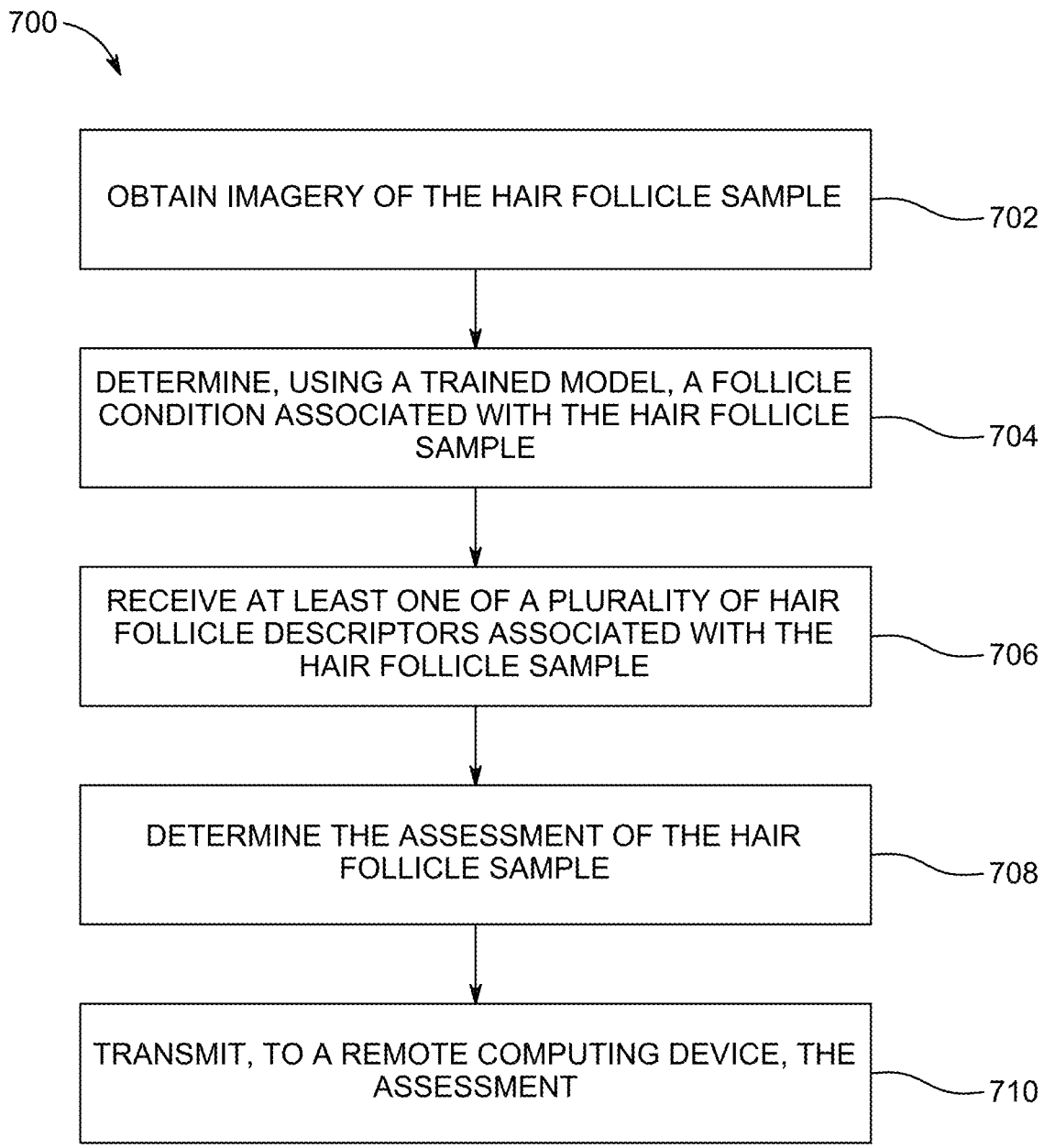
FIG. 7 illustrates a flowchart showing an example method implemented on a computing device, according to some embodiments.

FIG. 7 illustrates a flowchart showing an example method 700 that may be implemented on a computing device. The method 700 may include fewer or additional blocks and the blocks may be performed in an order that is different than illustrated. The method 700 may determine an assessment of a hair follicle sample, although other kinds of samples may be used as described herein.

The system (e.g., the analysis system 100) may obtain, using an image sensor 102 imagery of the hair follicle sample, at step 702. In some embodiments, the system may remove (e.g., using a follicle cleaning apparatus, such as the cleaning apparatus 104) one or more physical impurities from the hair follicle sample. The hair follicle sample may include a plurality of hair follicles in some embodiments. The cleaning may improve the quality of the obtained images. In some embodiments, the system may obtain, using the image sensor, imagery of follicle castings associated with the hair follicle sample. The castings may include surrounding material, such as organic material, that may provide additional information related to the follicle sample. The system may obtain a plurality of images of the sample. In some embodiments, the system obtains, for each of the plurality of elements of the hair follicle sample, imagery corresponding to different locations of the hair follicle sample. For example, one image may be obtained a first distance from a root of the follicle whereas a second image may be obtained at a second distance from the root of the follicle. Additionally, or alternatively, a first image may be obtained at a first side of a follicle while a second image may be obtained of a second side of the follicle. Other arrangements are possible.

In some embodiments the system may arrange, using a follicle fixturing apparatus (e.g., the fixturing apparatus 106), each of a plurality of hair follicles of the sample along a common alignment. The common alignment may help improve the quality of the images. The system may, for example, obtain the imagery of each of the plurality of hair follicles based on the common alignment, such as at a common angle, from a common vantage point or under common lighting conditions or some other aspect that takes advantage of the common alignment.

In some embodiments, the system may process received images before further analysis. For example, the system may deskew the obtained imagery. This may include, for example, rotating an image until the hair is straight. Additionally, or alternatively, the system may use the follicle fixturing apparatus to straighten the hair follicle(s). The system may scale pixel values to, for example, obtain a more useful or accurate image of the sample. For example, the system may scale the values from between 0-255 and 0-1. Additionally, or alternatively, the system may augment obtained images. For example, the system may mirror or reverse an image, rotate an image, and/or modify an image to create multiple images from a single initial image.

Successively, the system may determine a follicle condition associated with the hair follicle sample, at step 704. The follicle condition may include one or more assessment metrics, such as bounciness of the follicle sample, rigidity of the follicle sample, color of the follicle hair, level of hair follicle damage, a type of hair follicle damage, a health condition associated with a donor of the hair follicle sample, or some other follicle condition. The system may use a trained model (e.g., the trained machine learning model 124). Additionally, or alternatively, the determination may be based on the imagery of the hair follicle sample and/or on the imagery of the follicle castings. The trained model may return one or more results discussed above. For example, the trained machine learning model 124 may return a holistic analysis of hair, such as whether the hair is heavily damaged hair or in some other state. The trained machine learning model 124 may return a hair health score (e.g., on a scale of 1-10). In some embodiments, the trained model may return quantitative assessments of one or more individual aspects of the hair (e.g., cuticle lift, porosity, level of heat damage, theoretical length of healthy hair, etc.).

Successively, the system may receive at least one of a plurality of hair follicle descriptors associated with the hair follicle sample, at step 706. Examples of the hair follicle descriptors may include a follicle type of the hair follicle sample, a length associated with the hair follicle sample, an age of a donor of the hair follicle sample, a cross-sectional dimension (e.g., width, depth, circumference, diameter, etc.) associated with the hair follicle sample, a medical condition associated with the donor of the hair follicle sample, a curliness of the hair sample, a rigidness of the hair follicle sample, a surface roughness of the hair follicle sample, and/or any other hair follicle descriptor. In some embodiments, the length and/or cross-sectional dimension of the hair follicle sample may be determined by the trained model. Other hair follicle descriptors may include, for example, a donor natural hair type (e.g., straight, wavy, curly, etc.), an extent of donor scalp greasiness or dryness, an extent of frizziness associated with the hair follicle sample, a thickness of donor hair follicle sample, a porosity of donor hair follicle sample, a history of chemical exposure or treatment associated with the donor of the hair follicle sample, a hair growth rate of the donor, a history of the use of heated tools for modifying the hair follicle sample, a hair product usage of the donor, a history of the rate of hair washing of the hair follicle sample, a hairstyle history of the donor, a degree of outdoor activity of the donor, a diet of the donor, or other descriptors. The heated tools may include, for example, a curling iron, a flattening iron, or some other styling tool. The descriptors may be obtained via survey data provided by a follicle sample donor.

Successively, the system may determine, based on the follicle condition and/or on the at least one of the plurality of hair follicle descriptors, the assessment of the hair follicle sample, at step 708. The system may transmit the assessment to a remote computing device (e.g., the remote computing device 122), such as via a data interface (e.g., the data connection), at step 710. In some embodiments, the system may generate, based on the assessment of the hair follicle sample, data for displaying a report comprising a treatment recommendation.

The assessment may include a follicle condition quantifier of the hair follicle sample. The follicle condition quantifier may be scaled score of a quality, health, or treatment indicator. For example, the follicle condition quantifier may be useful in comparing a health level associated with the sample donor with a health level associated with another donor's sample and/or with the same sample donor over time. The follicle condition quantifier may be included in the report discussed above. The report may include a graphical representation (e.g., chart, line graph, bar graph, scatter plot, pie chart, etc.) quantifying at least a portion of the follicle condition quantifier of the hair follicle sample. The graphical representation may quantify the follicle condition quantifier as a function of at least one of the plurality of hair follicle descriptors described above. Additionally, or alternatively, the follicle condition quantifier may be shown as a function of time (e.g., of the same donor's follicle sample(s) over time). In some embodiments, the report may include a follicle condition threshold and/or an indicator of whether the follicle condition of the hair follicle sample exceeds the follicle condition threshold. The report may include an indication of a comparison of the donor's hair follicle sample to other donors in a population. For example, the population may include people of their same age group, hair type, lifestyle, or other population sharing one or more common characteristics of hair described herein. Additionally, or alternatively, the app may compare a donor to himself/herself over time to show how an updated lifestyle and/or treatment protocol (e.g., product use) are affecting (e.g., improving) their hair health.

In some embodiments, a donor may be interested obtaining improvement in their hair. Accordingly, in some embodiments the system may receive a target follicle condition (e.g., a particular bounciness, a particular rigidness, a particular color, a particular level of follicle health, a particular level of (or lack of) follicle damage, etc.). Determining the assessment of the hair follicle sample may be based at least in part on the target follicle condition. For example, the follicle condition threshold may be based at least in part on the target follicle condition.

Figure 8:
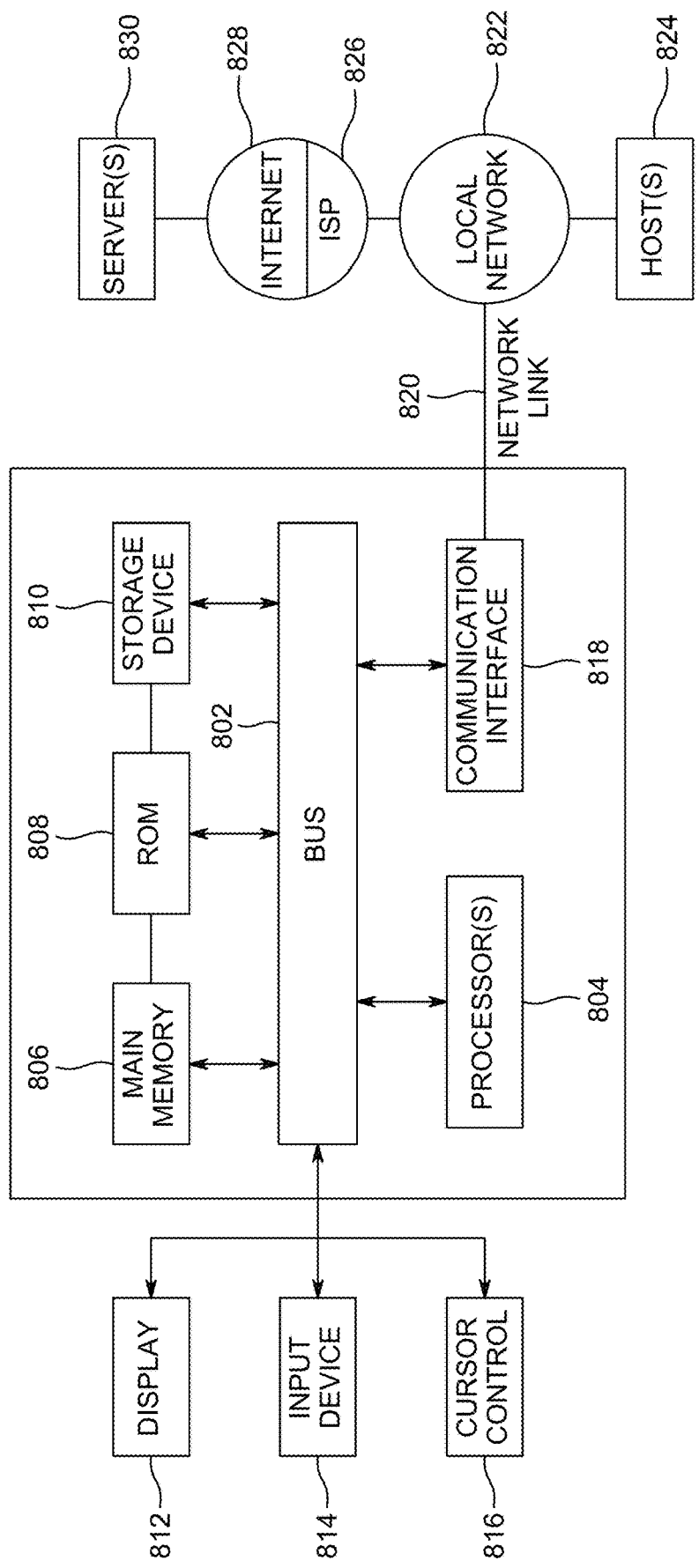
FIG. 8 is a block diagram that illustrates a computer system, according to some embodiments.
Figure 9A:
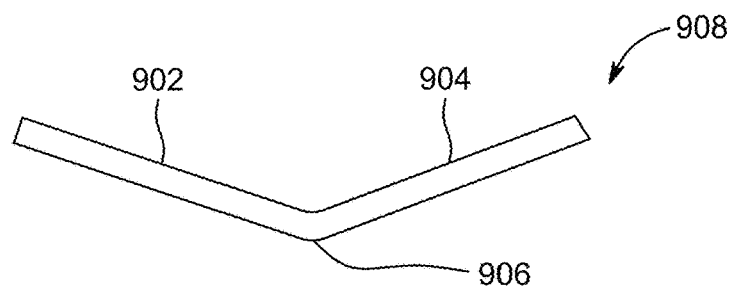
FIGS. 9A-9E illustrate side views of various orientations of analysis tubes, according to some embodiments.
Figure 9B:
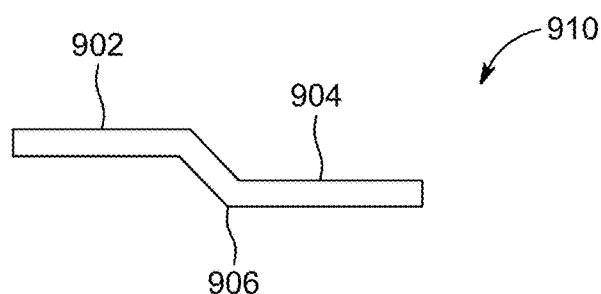
Figure 9C:
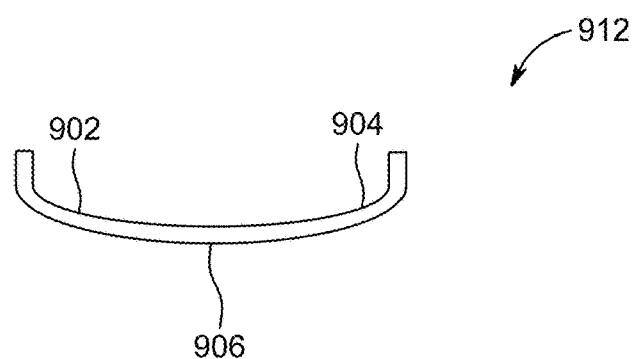
Figure 9D:
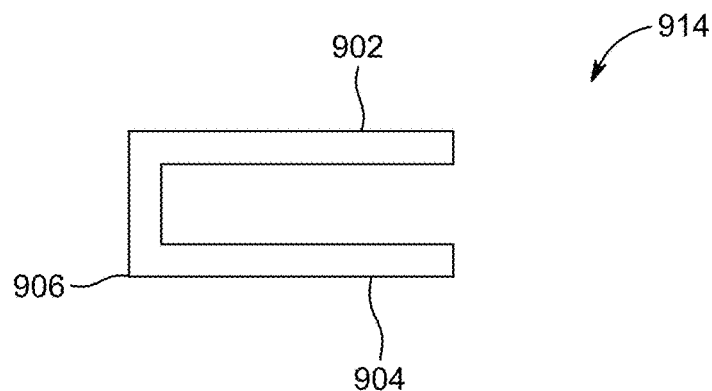
Figure 9E:
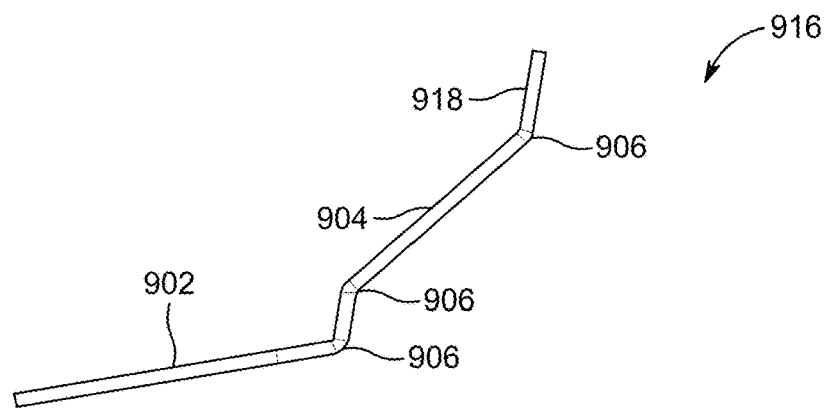
Figure 10A:
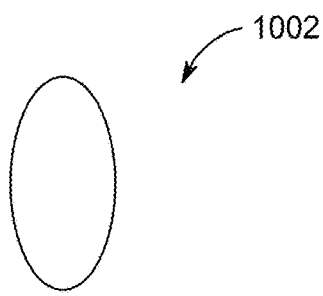
FIGS. 10A-10E illustrate front views of various shapes of the analysis tube aperture, according to some embodiments.
Figure 10B:
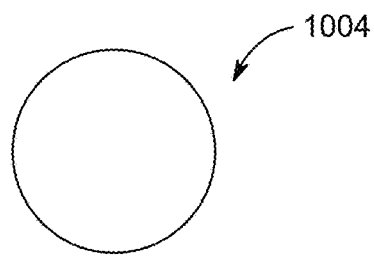
Figure 10C:
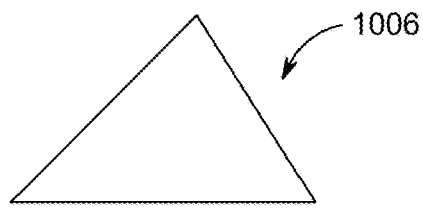
Figure 10D:
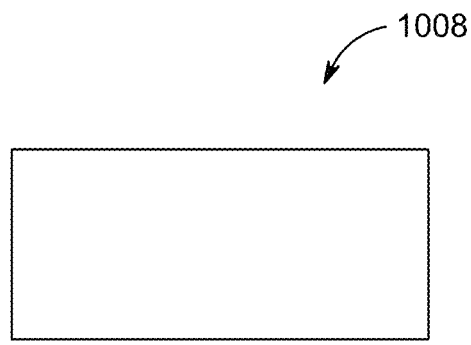
Figure 10E:
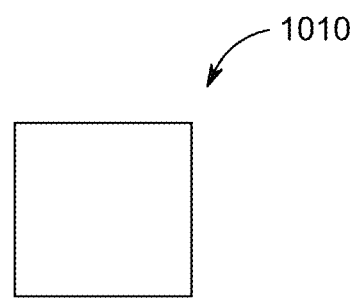

FIG. 8 is a block diagram that illustrates a computer system 800 upon which various embodiments may be implemented. FIG. 8 is described in conjunction with FIG. 1.

For example, the computer system 800 may be implemented as the data interface 114 (as shown in FIG. 1). The computer system 800 may include a bus 802 or other communication mechanism for communicating information, and a hardware processor, or multiple processors 804 coupled with bus 802 for processing information. The processor(s) 804 may be, for example, one or more general purpose microprocessors.

The computer system 800 also includes a main memory 806, such as a random access memory (RAM), cache and/or other dynamic storage devices, coupled to the bus 802 for storing information and instructions to be executed by the processor 804. The main memory 806 may be used for storing temporary variables or other intermediate information during execution of instructions to be executed by the processor 804. Such instructions, when stored in storage media accessible to the processor 804, render computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk, optical disk, or USB thumb drive (Flash drive), etc., is provided and coupled to bus 802 for storing information and instructions.

The computer system 800 may be coupled via the bus 802 to a display 812, such as a cathode ray tube (CRT) or LCD display (or touch screen), for displaying information to a computer user. An input device 814, including alphanumeric and other keys, is coupled to the bus 802 for communicating information and command selections to the processor 804. Another type of user input device is a cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as computer executable program instructions that are executed by the computing device(s). The computer system 800 may further, as described below, implement the techniques described herein using customized hard-wired logic, one or more ASICs or FPGAs, firmware and/or program logic which in combination with the computer system causes or programs the computer system 800 to be a special-purpose machine. According to some embodiments, the techniques herein are performed by the computer system 800 in response to the processor(s) 804 executing one or more sequences of one or more computer readable program instructions contained in the main memory 806. Such instructions may be read into the main memory 806 from another storage medium, such as the storage device 810. Execution of the sequences of instructions contained in the main memory 806 causes the processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor for execution. For example, the instructions may initially be carried on a magnetic disk or solid state drive of a remote computer. The remote computer may load the instructions into its dynamic memory and send the instructions over a telephone line using a modem. A modem local to the computer system 800 may receive the data on the telephone line and use an infra-red transmitter to convert the data to an infra-red signal. An infra-red detector may receive the data carried in the infra-red signal and appropriate circuitry may place the data on the bus 802. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. As another example, the communication interface 818 may be a local area network (LAN) card to provide a data communication connection to a compatible LAN (or WAN component to communicated with a WAN). Wireless links may also be implemented. In any such implementation, the communication interface 818 sends and receives electrical, electromagnetic or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP) 826. The ISP 826 in turn provides data communication services through the world wide packet data communication network now commonly referred to as an "Internet" 828. The local network 822 and the Internet 828 both use electrical, electromagnetic or optical signals that carry digital data streams. The signals through the various networks and the signals on the network link 820 and through the communication interface 818, which carry the digital data to and from the computer system 800, are example forms of transmission media.

The computer system 800 may send messages and receive data, including program code, through the network(s), the network link 820 and the communication interface 818. In the Internet example, a server 830 might transmit a requested code for an application program through the internet 828, The ISP 826, the local network 822 and communication interface 818. The received code may be executed by the processor 804 as it is received, and/or stored in the storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods may be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

FIGS. 9A-9E illustrate side views of various shapes and/or configurations of example analysis tubes, according to some embodiments. In some embodiments, the analysis tube 908 may include a first segment 902 and a second segment 904, separated by a tube bend 906. The opening may be defined as the opening or aperture of the analysis tube 112, as described below in FIGS. 10A-10E. The first segment 902 and the second segment 904 may be defined as the portions of the analysis tube divided by the tube bend 906. The first segment 902 and the second segment 904 may be disposed coaxial to each other in some embodiments. According to an some embodiments, the fiber scanner 108 may be equipped with the analysis tube of various bends and shapes. The bends of the analysis tube 112 may include a V-shape 908, an S-shape 910, a U-shape 912, a rectangular shape 914, and/or an irregular shape 916. The irregularly shaped analysis tub 916 may also comprise of a third segment 918 and/or a fourth segment (not illustrated). Any of these shapes may be concatenated or otherwise mixed together to create new shapes not shown. These are shown by way of example only.

In some embodiments, the analysis tube 112 may comprise second and third tube bends disposed between the first segment 902 and the second segment 904. The analysis tube 112 may include third, fourth, and/or other tube bends as necessary to achieve a target structure for holding the sample. These tube bends may be configured to cause the elongate fiber to simultaneously contact respective proximal interior surfaces of the first segment 902 and the second segment 904. In some embodiments, the first segment 902 and the second segment 904 may be disposed coaxial of each other. In some embodiments, the analysis tube 112 may comprise glass and/or other transparent material such as plastic.

In some embodiments, the aperture and the first segment 902 and the second segment 904 may elongate a distal interior surface of the analysis tube 112. The aperture may be configured to receive the sample into the aperture, and the tube bend 906 is shaped to cause the hair follicle to be disposed along a proximal interior surface of the second segment 904 opposite the distal interior surface of the analysis tube 112.

FIGS. 10A-10E illustrate example cross-sectional views of the aperture of analysis tube 112 in various shapes, according to some embodiments. The cross-sectional shapes of the opening of the analysis tube 112 may include an elliptical shape 1002, a circle shape 1004, a triangle shape 1006, a rectangle shape 1008, and/or a square shape 1010. The channel 240 of the analysis tube coupler 232 may be shaped to receive and/or couple to the corresponding cross-sectional shape of the analysis tube coupler 232.

Example Embodiments

In a 1st Example, a hair follicle analysis system configured to determine an assessment of a hair follicle sample, the system comprising: an image sensor configured to obtain imagery of the hair follicle sample; a data interface configured to transmit the assessment of the hair follicle sample to a remote computing device; a non-transitory memory comprising a trained model and executable instructions stored thereon; an electronic processor in communication with the non-transitory memory and configured to execute the instruction to cause the system to at least: obtain, using the image sensor, imagery of the hair follicle sample; determine, using the trained model and based on the imagery of the hair follicle sample, a follicle condition associated with the hair follicle sample; receive at least one of a plurality of hair follicle descriptors associated with the hair follicle sample, the plurality of hair follicle descriptors comprising: a follicle type of the hair follicle sample; a length associated with the hair follicle sample; a donor natural hair type; an extent of donor scalp greasiness or dryness; an extent of frizziness associated with the hair follicle sample; a thickness of donor hair follicle sample; a porosity of donor hair follicle sample; a history of chemical exposure or treatment associated with the donor of the hair follicle sample; a hair growth rate of the donor; a history of the use of heated tools for modifying the hair follicle sample; a hair product usage of the donor; a history of the rate of hair washing of the hair follicle sample; a hairstyle history of the donor; a degree of outdoor activity of the donor; a diet of the donor; an age of a donor of the hair follicle sample; and a cross-sectional dimension associated with the hair follicle sample; a medical condition associated with the donor of the hair follicle sample; determine, based on the follicle condition and on the at least one of the plurality of hair follicle descriptors, the assessment of the hair follicle sample; and transmit, via the data interface, the assessment of the hair follicle sample to the remote computing device.

In a 2nd Example, the system of Example 1, wherein the trained model comprises a convolutional neural network trained to identify the follicle condition associated with the hair follicle sample.

In a 3rd Example, the system of any of Examples 1-2, wherein the imagery comprises a plurality of images of the hair follicle sample.

In a 4th Example, the system of Example 3, wherein obtaining the imagery of the hair follicle sample comprises obtaining, for each of the plurality of images of the hair follicle sample, imagery corresponding to different locations of the hair follicle sample.

In a 5th Example, the system of any of Examples 1-4, further comprising a follicle cleaning apparatus, wherein the electronic processor is further configured to execute the instruction to cause the system to at least: remove, using the follicle cleaning apparatus, one or more physical impurities from the hair follicle sample.

In a 6th Example, the system of any of Examples 1-5, further comprising a follicle fixturing apparatus, wherein the hair follicle sample comprises a plurality of hair follicles, wherein the electronic processor is further configured to execute the instruction to cause the system to at least: arrange, using the follicle fixturing apparatus, each of the plurality of hair follicles along a common alignment.

In a 7th Example, the system of Example 6, wherein obtaining the imagery of the hair follicle sample comprises obtaining the imagery of each of the plurality of hair follicles based on the common alignment.

In a 8th Example, the system of any of Examples 1-7, wherein the electronic processor is further configured to execute the instruction to cause the system to at least: obtain, using the image sensor, imagery of follicle castings associated with the hair follicle sample, wherein determining the follicle condition associated with the hair follicle sample is further based on the imagery of the follicle castings.

In a 9th Example, the system of any of Examples 1-8, wherein receiving the at least one of the plurality of hair follicle descriptors associated with the hair follicle sample comprises receiving the at least one of the plurality of hair follicle descriptors via the data interface.

In a 10th Example, the system of any of Examples 1-9, wherein receiving the at least one of the plurality of hair follicle descriptors associated with the hair follicle sample comprises receiving survey data associated with the donor of the hair follicle sample.

In a 11th Example, the system of any of Examples 1-10, wherein the electronic processor is further configured to execute the instruction to cause the system to at least: generate, based on the assessment of the hair follicle sample, data for displaying a report comprising a treatment recommendation.

In a 12th Example, the system of Example 11, wherein transmitting the assessment of the hair follicle sample to the remote computing device comprises transmitting the generated data for displaying the report.

In a 13th Example, the system of Example 11, wherein the assessment comprises a follicle condition quantifier of the hair follicle sample.

In a 14th Example, the system of Example 12, wherein the report comprises a graphical representation quantifying at least a portion of the follicle condition quantifier of the hair follicle sample as a function of at least one of the plurality of hair follicle descriptors or as a function of time.

In a 15th Example, the system of Example 12, wherein determining the assessment of the hair follicle sample comprises determining that the follicle condition quantifier exceeds a follicle condition threshold.

In a 16th Example, the system of any of Examples 1-15, wherein the electronic processor is further configured to execute the instruction to cause the system to at least: receive a target follicle condition, wherein determining the assessment of the hair follicle sample is based at least in part on the target follicle condition.

In a 17th Example, the system of any of Examples 1-16, wherein the follicle condition comprises a type of hair follicle damage.

In an 18th Example, the system of any of Examples 1-17, wherein the image sensor comprises a microscope, and wherein obtaining the imagery of the hair follicle sample comprises obtaining imagery of the hair follicle sample at a microscopic level.

In a 19th Example, the system of any of Examples 1-18, wherein the image sensor comprises a microscope.

In a 20th Example, a computer-implemented method for determining an assessment of a hair follicle sample, the method comprising: removing, using a follicle cleaning apparatus, one or more physical impurities from the hair follicle sample, wherein the hair follicle sample comprises a plurality of hair follicles; obtaining, using an image sensor, imagery of the hair follicle sample; obtaining, using the image sensor, imagery of follicle castings associated with the hair follicle sample; determining, using a trained model and based on the imagery of the hair follicle sample and of the follicle castings, a follicle condition associated with the hair follicle sample; receiving at least one of a plurality of hair follicle descriptors associated with the hair follicle sample, the plurality of hair follicle descriptors comprising: a follicle type of the hair follicle sample; a length associated with the hair follicle sample; an age of a donor of the hair follicle sample; a cross-sectional dimension associated with the hair follicle sample; and a medical condition associated with the donor of the hair follicle sample; determining, based on the follicle condition and on the at least one of the plurality of hair follicle descriptors, the assessment of the hair follicle sample; and generating, based on the assessment of the hair follicle sample, data for displaying a report comprising a treatment recommendation; transmitting, via the data interface to a remote computing device, the generated data for displaying the report.

In a 21st Example, a fiber analysis system configured to capture and microscopically analyze an elongate fiber, the fiber analysis system comprising: an image sensor configured to obtain microscopic imagery of a portion of the elongate fiber disposed within a sensing region; a fiber analysis coupling comprising: an elongate driving roller extending along and configured to rotate about a drive axis, the elongate driving roller comprising a groove fabricated radially along the elongate driving roller; an actuator coupled to and configured to drive the elongate driving roller about the drive axis; a mount configured to couple the actuator to the image sensor; an analysis tube coupler; and an elongate free roller configured to rotate about an axis parallel to the drive axis in response to rotation of the elongate driving roller, the elongate free roller comprising a collar extending radially from the elongate free roller and configured to be received within the groove, wherein the collar and the groove are separated by a space sized to receive the elongate fiber therein; an analysis tube comprising an aperture and first and second segments separated by a tube bend, the analysis tube configured to be positioned within the analysis tube coupler, wherein in response to a rotation of the elongate driving roller, the elongate driving roller is configured to draw the elongate fiber into the aperture of the analysis tube, and wherein the tube bend is shaped to cause the elongate fiber to be disposed along an interior surface of the analysis tube within the sensing region; a non-transitory memory executable instructions stored thereon; and an electronic processor in communication with the non-transitory memory and configured to execute the instructions to cause the system to at least: cause the actuator to drive the elongate driving roller a first target amount; cause the image sensor to obtain the microscopic imagery of the portion of the elongate fiber disposed within the sensing region; and in response to the obtaining of the microscopic imagery, automatically cause the actuator to drive the elongate driving roller a second target amount.

In a 22nd Example, the fiber analysis system of Example 21, wherein the first target amount is different from the second target amount.

In a 23rd Example, the fiber analysis system of any of Examples 21-22, wherein the first target amount corresponds to a displacement of between about 1 cm and 5 cm of the elongate fiber.

In a 24th Example, the fiber analysis system of any of Examples 21-23, wherein the elongate fiber comprises a hair follicle.

In a 25th Example, the fiber analysis system of any of Examples 21-24, wherein the image sensor comprises a microscope.

In a 26th Example, the fiber analysis system of any of Examples 21-25, wherein the analysis tube comprises glass.

In a 27th Example, a fiber analysis coupling configured to capture and microscopically analyze an elongate fiber, the fiber analysis coupling comprising: an elongate driving roller extending along and configured to rotate about a drive axis; an actuator coupled to and configured to drive the elongate driving roller about the drive axis; a mount configured to couple the actuator to a microscope configured to obtain microscopic imagery of a portion of the elongate fiber disposed within a sensing region; and an elongate free roller configured to rotate about an axis parallel to the drive axis in response to rotation of the elongate driving roller, wherein the elongate driving roller and the elongate free roller are separated by a space sized to receive the elongate fiber therein.

In a 28th Example, the fiber analysis coupling of Example 27, further comprising the microscope.

In a 29th Example, the fiber analysis coupling of Example 27, wherein the elongate driving roller comprises a groove fabricated radially along the elongate driving roller.

In a 30th Example, the fiber analysis coupling of Example 29, wherein the elongate free roller comprises a collar extending radially from the elongate free roller, wherein the collar and the groove are separated by the space.

In a 31st Example, the fiber analysis coupling of any of Examples 27-30, further comprising an analysis tube comprising an aperture and first and second segments separated by a tube bend.

In a 32nd Example, the fiber analysis coupling of any of Examples 27-31, wherein in response to a rotation of the elongate driving roller, the elongate driving roller is configured to draw the elongate fiber into the aperture of the analysis tube.

In a 33rd Example, the fiber analysis coupling of any of Examples 27-32, wherein the tube bend is shaped to cause the elongate fiber to be disposed along an interior surface of the analysis tube within the sensing region.

In a 34th Example, the fiber analysis coupling of Example 33, further comprising second and third tube bends disposed between the first and second segments and configured to cause the elongate fiber to simultaneously contact respective proximal interior surfaces of the first and second segments.

In a 35th Example, the fiber analysis coupling of any of Examples 27-34, further comprising: a non-transitory memory executable instructions stored thereon; and an electronic processor in communication with the non-transitory memory and configured to execute the instruction to cause the coupling to at least: cause the actuator to drive the elongate driving roller a first target amount; cause the microscope to obtain the microscopic imagery of the portion of the elongate fiber disposed within the sensing region; and in response to the obtaining of the microscopic imagery, automatically cause the actuator to drive the elongate driving roller a second target amount.

In a 36th Example, an analysis tube comprising an aperture and first and second segments separated by a tube bend elongating a distal interior surface of the analysis tube, the aperture configured to receive a hair follicle into the aperture, wherein the tube bend is shaped to cause the hair follicle to be disposed along a proximal interior surface of the second segment analysis tube opposite the distal interior surface.

In a 37th Example, the analysis tube of Example 36, further comprising second and third tube bends disposed between the first and second segments.

In a 38th Example, the analysis tube of Example 37, wherein the first and second segments are configured to cause the hair follicle to simultaneously contact respective proximal interior surfaces of the first and second segments.

In a 39th Example, the analysis tube of any of Examples 36-38, wherein the first and second segments are disposed coaxial of each other.

In a 40th Example, the analysis tube of any of Examples 36-39, wherein the analysis tube comprises glass.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium may be a tangible device that may retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto may be performed in other sequences that are appropriate.

It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A fiber analysis system configured to capture and microscopically analyze an elongate fiber, the fiber analysis system comprising:
    an image sensor configured to obtain microscopic imagery of a portion of the elongate fiber disposed within a sensing region;
    a fiber analysis coupling comprising:
        an elongate driving roller extending along and configured to rotate about a drive axis, the elongate driving roller comprising a groove fabricated radially along the elongate driving roller;
        an actuator coupled to and configured to drive the elongate driving roller about the drive axis;
        a mount configured to couple the actuator to the image sensor;
        an analysis tube coupler; and
        an elongate free roller configured to rotate about an axis parallel to the drive axis in response to rotation of the elongate driving roller, the elongate free roller comprising a collar extending radially from the elongate free roller and configured to be received within the groove, wherein the collar and the groove are separated by a space sized to receive the elongate fiber therein;
    an analysis tube comprising an aperture and first and second segments separated by a tube bend, the analysis tube configured to be positioned within the analysis tube coupler, wherein in response to a rotation of the elongate driving roller, the elongate driving roller is configured to draw the elongate fiber into the aperture of the analysis tube, and wherein the tube bend is shaped to cause the elongate fiber to be disposed along an interior surface of the analysis tube within the sensing region;
    a non-transitory memory executable instructions stored thereon; and
    an electronic processor in communication with the non-transitory memory and configured to execute the instructions to cause the system to at least:
        cause the actuator to drive the elongate driving roller a first target amount;
        cause the image sensor to obtain the microscopic imagery of the portion of the elongate fiber disposed within the sensing region; and
        in response to the obtaining of the microscopic imagery, automatically cause the actuator to drive the elongate driving roller a second target amount.

2. The fiber analysis system of claim 1, wherein the first target amount is different from the second target amount.

3. The fiber analysis system of claim 1, wherein the first target amount corresponds to a displacement of between about 1 cm and 5 cm of the elongate fiber.

4. The fiber analysis system of claim 1, wherein the elongate fiber comprises a hair follicle.

5. The fiber analysis system of claim 1, wherein the image sensor comprises a microscope.

6. The fiber analysis system of claim 1, wherein the analysis tube comprises glass.

7. A fiber analysis coupling configured to capture and microscopically analyze an elongate fiber, the fiber analysis coupling comprising:
    an elongate driving roller extending along and configured to rotate about a drive axis;
    an actuator coupled to and configured to drive the elongate driving roller about the drive axis;
    a mount configured to couple the actuator to a microscope configured to obtain microscopic imagery of a portion of the elongate fiber disposed within a sensing region; and
    an elongate free roller configured to rotate about an axis parallel to the drive axis in response to rotation of the elongate driving roller, wherein the elongate driving roller and the elongate free roller are separated by a space sized to receive the elongate fiber therein.

8. The fiber analysis coupling of claim 7, further comprising the microscope.

9. The fiber analysis coupling of claim 7, wherein the elongate driving roller comprises a groove fabricated radially along the elongate driving roller.

10. The fiber analysis coupling of claim 9, wherein the elongate free roller comprises a collar extending radially from the elongate free roller, wherein the collar and the groove are separated by the space.

11. The fiber analysis coupling of claim 7, further comprising an analysis tube comprising an aperture and first and second segments separated by a tube bend.

12. The fiber analysis coupling of claim 11, wherein in response to a rotation of the elongate driving roller, the elongate driving roller is configured to draw the elongate fiber into the aperture of the analysis tube.

13. The fiber analysis coupling of claim 11, wherein the tube bend is shaped to cause the elongate fiber to be disposed along an interior surface of the analysis tube within the sensing region.

14. The fiber analysis coupling of claim 13, further comprising second and third tube bends disposed between the first and second segments and configured to cause the elongate fiber to simultaneously contact respective proximal interior surfaces of the first and second segments.

15. The fiber analysis coupling of claim 7, further comprising:
- a non-transitory memory executable instructions stored thereon; and
- an electronic processor in communication with the non-transitory memory and configured to execute the instruction to cause the coupling to at least:
  - cause the actuator to drive the elongate driving roller a first target amount;
  - cause the microscope to obtain the microscopic imagery of the portion of the elongate fiber disposed within the sensing region; and
  - in response to the obtaining of the microscopic imagery, automatically cause the actuator to drive the elongate driving roller a second target amount.

16. An analysis tube comprising an aperture and first and second segments separated by a tube bend elongating a distal interior surface of the analysis tube, the aperture configured to receive a hair follicle into the aperture, wherein the tube bend is shaped to cause the hair follicle to be disposed along a proximal interior surface of the second segment analysis tube opposite the distal interior surface.

17. The analysis tube of claim 16, further comprising second and third tube bends disposed between the first and second segments.

18. The analysis tube of claim 17, wherein the first and second segments are configured to cause the hair follicle to simultaneously contact respective proximal interior surfaces of the first and second segments.

19. The analysis tube of claim 16, wherein the first and second segments are disposed coaxial of each other.

20. The analysis tube of claim 16, wherein the analysis tube comprises glass.

\* \* \* \* \*